(12) United States Patent
Kuang et al.

(10) Patent No.: US 12,192,318 B2
(45) Date of Patent: Jan. 7, 2025

(54) QUANTUM-SAFE CRYPTOGRAPHIC METHOD AND SYSTEM

(71) Applicant: Quantropi Inc., Ottawa (CA)

(72) Inventors: Randy Kuang, Ottawa (CA); Maria Perepechaenko, Ottawa (CA)

(73) Assignee: Quantropi Inc., Ottawa (CA)

( * ) Notice: Subject to any disclaimer, the term of this patent is extended or adjusted under 35 U.S.C. 154(b) by 167 days.

(21) Appl. No.: 17/964,709

(22) Filed: Oct. 12, 2022

(65) Prior Publication Data

US 2023/0052431 A1 Feb. 16, 2023

Related U.S. Application Data

(63) Continuation-in-part of application No. PCT/CA2021/050319, filed on Mar. 10, 2021.
(Continued)

(51) Int. Cl.
*H04L 9/00* (2022.01)
*H04L 9/06* (2006.01)
(Continued)

(52) U.S. Cl.
CPC .......... *H04L 9/002* (2013.01); *H04L 9/0618* (2013.01); *H04L 9/0877* (2013.01); *H04L 9/3093* (2013.01)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS 5,724,425 A   3/1998  Chang et al.
5,764,765 A * 6/1998  Phoenix ............... H04L 9/0858
                                              380/256
(Continued)

FOREIGN PATENT DOCUMENTS

CA      2374189 A1   9/2003
CN    114338030 A    4/2022
(Continued)

OTHER PUBLICATIONS

Office Action mailed Sep. 29, 2020 in connection with U.S. Appl. No. 16/921,583.
(Continued)

*Primary Examiner* — Sharif E Ullah
(74) *Attorney, Agent, or Firm* — Wolf, Greenfield & Sacks, P.C.

(57) ABSTRACT

A cryptographic method and system. A plurality of ciphers is identified in a message received by a recipient, such message encrypting a digital asset. A private key associated with the recipient is obtained. The private key corresponds to a public key associated with the recipient. The method includes solving for x in the equation: $[(f_0(R_0^{-1}\overline{N}'_0 \bmod S) + \overline{P}' + f_\lambda(R_n^{-1}\overline{N}'_n \bmod S))/(h_0(R_0^{-1}\overline{N}'_0 \bmod S) + \overline{Q}' + h_\lambda(R_n^{-1}\overline{N}'_n \bmod S))]*h(x) - f(x) = 0 \bmod p$, where (i) $\overline{P}'$, $\overline{Q}'$, $\overline{N}'_0$, and $\overline{N}'_n$ correspond to the ciphers in the received message; (ii) $R_0$, $R_n$ and $S$ are data elements of the private key; (iii) $f(\cdot)$ is a polynomial function defined by coefficients $f_0, f_1, \ldots f_\lambda$ that are also data elements of the private key; and (iv) $h(\cdot)$ is a polynomial function defined by coefficients $h_0, h_1, \ldots h_\lambda$ that are also data elements of the private key. The value of x is assigned to the digital asset, which is then stored in non-transitory memory or packaged in a message sent over the data network.

30 Claims, 7 Drawing Sheets

Related U.S. Application Data

(60) Provisional application No. 63/327,491, filed on Apr. 5, 2022.

(51) Int. Cl.
*H04L 9/08* (2006.01)
*H04L 9/30* (2006.01)

(58) Field of Classification Search
CPC ....... H04L 9/3226; H04L 9/0891; H04L 9/14; H04L 9/0827; H04L 2209/24; H04L 9/08; H04L 9/0819; H04L 9/088; H04L 9/002; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ................ 380/255, 264, 276; 726/2, 21, 36; 713/150, 163, 181
See application file for complete search history.

(56) References Cited

U.S. PATENT DOCUMENTS

| | | | |
|---|---|---|---|
| 5,996,076 | A | 11/1999 | Rowney et al. |
| 6,188,768 | B1 | 2/2001 | Bethune et al. |
| 6,678,379 | B1 | 1/2004 | Mayers et al. |
| 6,748,083 | B2* | 6/2004 | Hughes ................ H04L 9/0858 380/278 |
| 6,801,626 | B1 | 10/2004 | Nambu |
| 7,065,210 | B1 | 6/2006 | Tsujii et al. |
| 7,437,081 | B2* | 10/2008 | Mitchell ................ H04B 10/70 398/154 |
| 7,570,767 | B2 | 8/2009 | Lo |
| 7,991,152 | B2 | 8/2011 | Gueron et al. |
| 8,675,876 | B2* | 3/2014 | Yamamoto ............ H04L 9/0858 380/278 |
| 8,855,316 | B2* | 10/2014 | Wiseman ............. H04L 9/0855 380/278 |
| 9,219,604 | B2 | 12/2015 | Resch et al. |
| 9,960,465 | B2* | 5/2018 | Dudley ................ H01M 50/204 |
| 10,057,058 | B2* | 8/2018 | Murakami ............ H04L 9/0858 |
| 10,484,185 | B2 | 11/2019 | Fu |
| 10,541,809 | B2* | 1/2020 | Godfrey ................ H04B 10/70 |
| 10,951,404 | B1 | 3/2021 | Kuang |
| 11,170,092 | B1 | 11/2021 | Liang |
| 11,190,343 | B2* | 11/2021 | Shim ..................... H04L 9/3247 |
| 11,641,347 | B2 | 5/2023 | Kuang et al. |
| 2002/0015491 | A1 | 2/2002 | Nishioka et al. |
| 2005/0135627 | A1 | 6/2005 | Zavriyev et al. |
| 2005/0138352 | A1* | 6/2005 | Gauvreau ............. H04L 9/3247 713/153 |
| 2005/0190922 | A1 | 9/2005 | LaGasse |
| 2005/0286723 | A1 | 12/2005 | Vig et al. |
| 2006/0085737 | A1* | 4/2006 | Liu ......................... H03M 7/30 715/234 |
| 2006/0136728 | A1 | 6/2006 | Gentry et al. |
| 2007/0065154 | A1* | 3/2007 | Luo ..................... H04J 14/0282 398/141 |
| 2007/0076883 | A1 | 4/2007 | Kuang |
| 2007/0076884 | A1* | 4/2007 | Wellbrock ........... H04L 9/0855 380/263 |
| 2007/0076888 | A1 | 4/2007 | Kuang et al. |
| 2007/0087756 | A1 | 4/2007 | Hoffberg |
| 2007/0160212 | A1 | 7/2007 | Zavriyev et al. |
| 2007/0195774 | A1* | 8/2007 | Sherman ................ H04L 69/16 370/392 |
| 2008/0222734 | A1 | 9/2008 | Redlich et al. |
| 2009/0249068 | A1 | 10/2009 | Farrugia et al. |
| 2010/0329447 | A1 | 12/2010 | Akiyama et al. |
| 2011/0206204 | A1* | 8/2011 | Sychev ............... H04J 14/0256 380/256 |
| 2011/0213979 | A1* | 9/2011 | Wiseman .............. H04L 9/0844 713/171 |
| 2014/0010234 | A1* | 1/2014 | Patel ...................... H04L 45/74 370/392 |
| 2014/0068765 | A1* | 3/2014 | Choi ..................... H04L 63/1416 726/23 |
| 2014/0133652 | A1* | 5/2014 | Oshida ................. H04L 9/0897 380/255 |
| 2015/0033025 | A1 | 1/2015 | Hoffstein et al. |
| 2015/0172292 | A1 | 6/2015 | Kuang et al. |
| 2016/0164884 | A1 | 6/2016 | Sriram et al. |
| 2016/0241396 | A1* | 8/2016 | Fu .......................... H04L 9/0836 |
| 2016/0359626 | A1* | 12/2016 | Fu .......................... H04L 9/0858 |
| 2016/0366094 | A1* | 12/2016 | Mason ................. H04L 61/5038 |
| 2017/0063827 | A1 | 3/2017 | Ricardo |
| 2017/0141918 | A1 | 5/2017 | Dubrova et al. |
| 2017/0214525 | A1* | 7/2017 | Zhao ................... H04W 12/0431 |
| 2017/0230173 | A1* | 8/2017 | Choi ..................... H04L 9/0861 |
| 2017/0324553 | A1 | 11/2017 | Ahn |
| 2017/0324554 | A1 | 11/2017 | Tomlinson et al. |
| 2018/0109377 | A1 | 4/2018 | Fu |
| 2018/0176091 | A1* | 6/2018 | Yoon .................... H04L 43/0888 |
| 2018/0278426 | A1 | 9/2018 | Tang et al. |
| 2019/0036821 | A1* | 1/2019 | Levy ................... G06F 12/0868 |
| 2019/0349392 | A1* | 11/2019 | Wetterwald ......... H04L 43/0852 |
| 2019/0386832 | A1 | 12/2019 | Palyutina et al. |
| 2020/0084030 | A1 | 3/2020 | Nendell |
| 2020/0084222 | A1* | 3/2020 | William .................. H04L 63/12 |
| 2020/0266980 | A1 | 8/2020 | Grant |
| 2020/0274701 | A1* | 8/2020 | Yuan ..................... H04L 9/0841 |
| 2020/0280436 | A1* | 9/2020 | Nix ....................... H04L 9/3066 |
| 2020/0322141 | A1* | 10/2020 | Kinjo ................... H04L 9/0852 |
| 2022/0103375 | A1 | 3/2022 | El Kaafarani et al. |
| 2022/0150064 | A1 | 5/2022 | Akiyama |
| 2022/0311752 | A1* | 9/2022 | Kuang .................. H04L 9/0618 |

FOREIGN PATENT DOCUMENTS

| | | | |
|---|---|---|---|
| EP | 1249963 | A2 | 10/2002 |
| JP | 2006-208967 | A | 8/2006 |
| JP | 2009-171384 | A | 7/2009 |
| WO | 2014/174491 | A1 | 10/2014 |
| WO | 2020/098833 | A2 | 5/2020 |
| WO | 2021/009860 | A1 | 1/2021 |
| WO | 2021/248226 | A1 | 12/2021 |
| WO | 2021/248227 | A1 | 12/2021 |
| WO | WO 2022/187959 | A1 | 9/2022 |
| WO | WO 2023/193088 | A1 | 10/2023 |

OTHER PUBLICATIONS

Notice of Allowance mailed Jan. 22, 2021 in connection with U.S. Appl. No. 16/921,583.
International Search Report and Written Opinion mailed Jun. 1, 2022 in connection with International Application No. PCT/CA2022/050349.
International Search Report and Written Opinion mailed May 14, 2021 in connection with International Application No. PCT/CA2021/050319.
International Search Report and Written Opinion mailed Apr. 15, 2021 in connection with International Application No. PCT/CA2021/050147.
[No. Author Listed], Security Requirements for Cryptographic Modules. Fips Pub 140-2. Information Technology Laboratory, National Institute of Standards and Technology. May 25, 2001. 69 pages.
Bourgain et al., Character sums and deterministic polynomial root finding in finite fields. arXiv:1308.4803v2. Mar. 10, 2014. 11 pages.
Chang et al., Quantum annealing for systems of polynomial equations. Scientific Reports. Jul. 2019;9(1):1-9. DOI: 10.1038/s41598-019-46729-0.
Ding et al., Multivariate Public Key Cryptography. Sep. 26, 2009. 48 pages. URL:http://www.iis.sinica.edu.tw/papers/byyang/12734-F.pdf [last accessed May 12, 2021].
Horodecki et al., Quantum Entanglement. arXiv:quant-ph/0702225v2. Apr. 20, 2007. 110 pages.

(56) References Cited

OTHER PUBLICATIONS

Kasahara, Construction of a New Class of Linear Multivariate Public Key Cryptosystem, K(I)SE(1)PKC. Nov. 7, 2009. 5 pages. URL:https://eprint.iacr.org/2009/546.pdf [last accessed May 12, 2021].

Moody et al., NIST PQC Standardization Update—Round 2 and Beyond. Crypto Technology Group, National Institute of Standards and Technology. Sep. 2020. 38 pages. URL:https://csrc.nist.gov/CSRC/media/Presentations/pqc-update-round-2-and-beyond/images-media/pqcrypto-sept2020-moody.pdf [last accessed Oct. 14, 2022].

Okyere-Gyamfi et al., An Enhanced Asymmetric Cryptosystem using Multiple Key System. International Journal of Computer Applications. Apr. 2020;176(15):18-26.

Sun et al., Quantum algorithm for polynomial root finding problem. 2014 Tenth International Conference on Computational Intelligence and Security. Nov. 2014, pp. 469-473. DOI: 10.1109/CIS.2014.40.

Office Action mailed Sep. 1, 2022 in connection with USAN U.S. Appl. No. 17/691,295.

Notice of Allowance mailed Jan. 9, 2023, in connection with usan U.S. Appl. No. 17/691,295.

Hegade et al., Digitized-counterdiabatic quantum factorization. arXiv preprint arXiv:2301.11005. Jan. 26, 2023. 3 pages.

Wang et al., An improved signature model of multivariate polynomial public key cryptosystem against key recovery attack. Mathematical Biosciences and Engineering. Aug. 2019;16(6):7734-50.

Yan et al., Factoring integers with sublinear resources on a superconducting quantum processor. arXiv preprint arXiv:2212.12372. Dec. 23, 2022. 32 pages.

PCT/CA2023/050423, May 26, 2023, International Search Report and Written Opinion.

International Search Report and Written Opinion mailed May 26, 2023 in connection with PCT/CA2023/050423.

\* cited by examiner

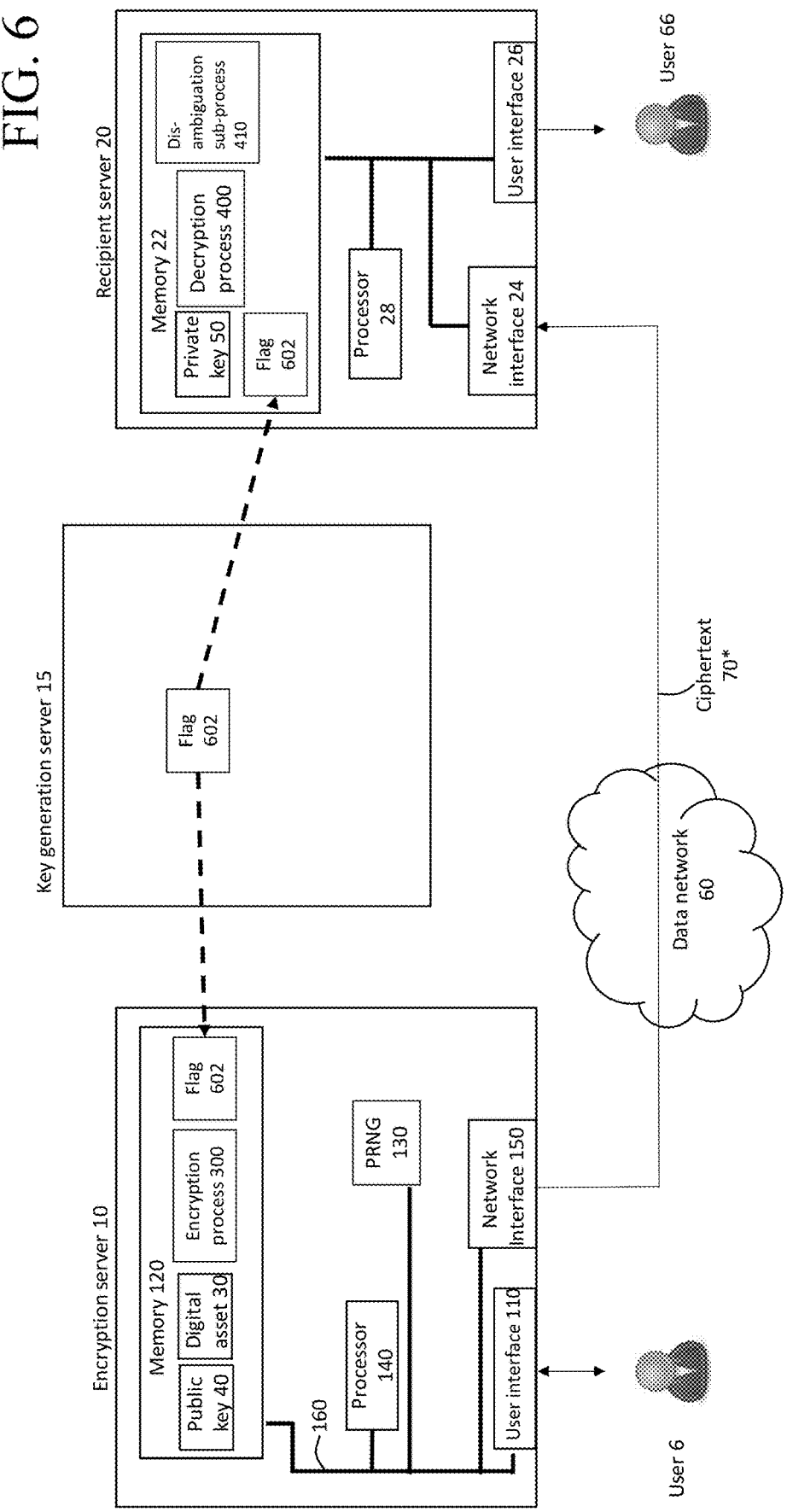

FIG. 7

Sizes (bytes)

| ENCRYPTION METHOD | Level I | | | | Level III | | | | Level V | | | |
|---|---|---|---|---|---|---|---|---|---|---|---|---|
| | $PK^1$ | $SK^1$ | $CT^1$ | | $PK$ | $SK$ | $CT$ | | $PK$ | $SK$ | $CT$ | |
| McEliece | 261K | 6492 | 128 | | 524K | 13,608 | 188 | | 1,044K | 14K | 240 | |
| Kyber | 800 | 1632 | 768 | | 1,184 | 2,400 | 1,088 | | 1,568 | 3,168 | 1,568 | |
| NTRU | 699 | 935 | 699 | | 930 | 1,234 | 930 | | 1,230 | 1,590 | 1,230 | |
| Saber | 672 | 1,568 | 736 | | 1,312 | 3,040 | 1,472 | | 1,312 | 3,040 | 1,472 | |
| OPTION A — MPPK | 230 | 83 | 272 | | 380 | 83 | 272 | | 350 | 83 | 272 | |

$^1$ We denote the secret key as $SK$, the public key as $PK$, and the ciphertext as $CT$.

FIG. 8

Sizes (bytes)

| ENCRYPTION METHOD | Level I | | | Level III | | | Level V | | |
|---|---|---|---|---|---|---|---|---|---|
| | $PK^1$ | $SK^1$ | $CT^1$ | $PK$ | $SK$ | $CT$ | $PK$ | $SK$ | $CT$ |
| McEliece | 261K | 6492 | 128 | 524K | 13,608 | 188 | 1,044K | 14K | 240 |
| Kyber | 800 | 1632 | 768 | 1,184 | 2,400 | 1,088 | 1,568 | 3,168 | 1,568 |
| NTRU | 699 | 935 | 699 | 930 | 1,234 | 930 | 1,230 | 1,590 | 1,230 |
| Saber | 672 | 1,568 | 736 | 1,312 | 3,040 | 1,472 | 1,312 | 3,040 | 1,472 |
| OPTION B (64, 1, 1, 2) | 195 | 105 | 224 | 195 | 76 | 240 | 204 | 100 | 208 |
| OPTION B (64, 1, 1, 3) | 162 | 52 | 224 | 234 | 76 | 240 | 306 | 100 | 208 |

$^1$ We denote the secret key as $SK$, the public key as $PK$, and the ciphertext as $CT$.

QUANTUM-SAFE CRYPTOGRAPHIC METHOD AND SYSTEM

CROSS-REFERENCES TO RELATED APPLICATIONS

The present application is a continuation-in-part of PCT International Application No. PCT/CA2021/050319, filed on Mar. 10, 2021, hereby incorporated by reference herein. The present application also claims the benefit of U.S. Provisional Application Ser. No. 63/327,491 filed on Apr. 5, 2022, hereby incorporated by reference herein.

FIELD

The present disclosure relates generally to a cryptographic method and system and, more particularly, to a method and system for encryption and decryption that are resistant to powerful cryptanalytic attacks, such as by a quantum computer.

BACKGROUND

One application of cryptography is digital encryption involving two parties that use respective digital keys to encrypt digital data that they wish to send to one another. For example, each party may securely store a private key that corresponds to a public key. The public key is made available to other parties (potential senders), but the private key is kept secret. One of the parties acting as a sender of a message can access the other party's (i.e., the recipient's) public key, encrypt the message and send a ciphertext to the recipient. The recipient uses the corresponding (and secretly stored) private key to decrypt the message from the ciphertext.

The private key and the corresponding public key are intertwined in a complex mathematical relationship that is difficult to guess, yet any hypothesis as to the nature of this relationship can be easily tested. As a result, unless one has the correct private key, decryption of the data is difficult; however, it not impossible. In fact, malicious parties throughout the world specialize in reverse engineering mathematical relationships (an act known as "cracking") to obtain a "cracked key". A cracked key is any key that can be used to successfully decrypt a message encrypted with the recipient's public key. In that sense, a cracked key can correspond to the private key but might also be one of possibly several other keys that lead to the same result.

The difficulty of cracking a private key in today's private/public key infrastructure is a function of various factors, such as the complexity of the mathematical relationship, the key length (in bits) and a malicious party's available computing power. The greater the key length and the more complex the mathematical relationship, the more difficult it will be to crack the private key. However, with the advent of quantum computing, the security of a private key previously believed to be uncrackable is now in doubt. Thus, mathematical relationships have to become more complex, and keys need to be made even longer in order for the security of the private key to keep up with increases in computing power available to malicious parties.

However, increases in mathematical complexity and key length are counterproductive, as they lead to increases in latency and computational effort. In fact, the mathematical complexity and key lengths that would be required by today's encryption schemes in order to make a private key acceptably secure against the threat of a quantum computing cryptanalytic attack would bring digital communication over the internet to a standstill.

As such, the industry would welcome an encryption technique that is highly secure, is computationally simple and has low latency.

SUMMARY

Accordingly, there is provided a cryptographic system in which an encryption key (e.g., a public key) and a corresponding decryption key (e.g., a private key) are generated in accordance with a specific key generation process to provide enhanced security with a relatively small number of bits, thus finding application in real-time, low-latency, high-speed and/or low-memory environments. With a digital asset encrypted into a ciphertext using the specially generated encryption key, the ciphertext is extremely difficult for a malicious user to transform back into the digital asset without the decryption key. The numerical order of difficulty can be higher than what is practical using today's computing devices and even what is expected to be achievable using quantum computers. As such, there is provided a truly quantum-safe encryption and decryption process.

Accordingly, there is provided a method of operating a computing apparatus of a recipient to decrypt a digital asset from a message received over a data network, the method comprising: identifying a plurality of ciphers in the received message; retrieving from a memory of the computing apparatus a private cryptographic key associated with the recipient, the private cryptographic key corresponding to a public cryptographic key associated with the recipient, the private cryptographic key comprising a plurality of private cryptographic key data elements; solving for x in the equation:

$$[(f_0(R_0^{-1}\overline{N}'_0 \bmod S)+\overline{P}'+f_\lambda(R_n^{-1}\overline{N}'_n \bmod S))/(h_0(R_0^{-1}\overline{N}'_0 \bmod S)+\overline{Q}'+h_\lambda(R_n^{-1}\overline{N}'_n \bmod S))]*h(x)-f(x)=0 \bmod p, \text{ where:}$$

p is a predetermined integer stored in the memory of the computing apparatus;

$\overline{P}'$, $\overline{Q}'$, $\overline{N}'_0$, and $\overline{N}'_n$ correspond to the ciphers in the received message;

$R_0$, $R_n$ and $S$ are included in the private cryptographic key data elements;

$f(\cdot)$ is a first polynomial function defined by a set of coefficients $f_0, f_1, \ldots f_\lambda$ included in the private cryptographic key data elements, with $\lambda$ being a predetermined integer; and $h(\cdot)$ is a second polynomial function defined by a set of coefficients $h_0, h_1, \ldots h_\lambda$ included in the private cryptographic key data elements.

The method further comprises assigning the value of x to the digital asset; and storing the digital asset in non-transitory memory or packaging the digital asset in a message sent over the data network.

There is also provided a method of operating a computing apparatus of a recipient to decrypt a digital asset from a message received over a data network, the method comprising: identifying a plurality of ciphers in the received message; retrieving from a memory of the computing apparatus a private cryptographic key associated with the recipient, the private cryptographic key corresponding to a public cryptographic key associated with the recipient, the private cryptographic key comprising a plurality of private cryptographic key data elements; solving for x in the equation:

$$[(R_p^{-1}\overline{P}' \bmod S_p)/(R_q^{-1}\overline{Q}' \bmod S_q)]*h(x)-f(x)=0 \bmod p, \text{ where:}$$

p is a predetermined integer stored in the memory of the computing apparatus;

$P'$ and $\overline{Q}'$ correspond to the ciphers in the received message;

$R_p$, $R_q$, $S_p$ and $S_q$ are included in the private cryptographic key data elements;

$f(\cdot)$ is a first polynomial function defined by a set of coefficients $f_0$, $f_1$, ... $f_\lambda$ included in the private cryptographic key data elements; and $h(\cdot)$ is a second polynomial function defined by a set of coefficients $h_0$, $h_1$, ... $h_\lambda$ included in the private cryptographic key data elements.

The method further comprises assigning the value of x to the digital asset; and storing the digital asset in non-transitory memory or packaging the digital asset in a message sent over the data network.

There is also provided a non-transitory computer-readable storage medium comprising computer-readable instructions which, when executed by a processing entity of a computing apparatus, cause the computing apparatus to carry out operations to decrypt a digital asset that is encrypted in a message received from a sender over a data network. These operations may include those of the aforementioned methods, for example.

There is further provided a method of operating an encryption server to encrypt a digital asset for transmission over a data network, the method comprising:

identifying a public key associated with a recipient, the public key comprising a first, a second, a third and a fourth set of public key coefficients, the public key being part of a public-private key pair associated with the recipient;

selecting m noise variables, wherein m is an integer greater than or equal to 1;

creating a plurality of ciphers based on the public key, the digital asset and the noise variables, wherein the ciphertext comprises:

a first cipher computed as the result of using the first set of public key coefficients as the coefficients of a first polynomial of the digital asset;

a second cipher computed as the result of using the second set of public key coefficients as the coefficients of a second polynomial of the digital asset;

a third cipher computed as the result of using the third set of public key coefficients as the coefficients of the terms of a linear combination of the noise variables; and a fourth cipher computed as the result of using the fourth set of public key coefficients as the coefficients of the terms of a linear combination of the noise variables multiplied by the digital asset to the power $n+\lambda$, where n and $\lambda$ are integers at least as great as one; and sending a message comprising the plurality of ciphers over the data network towards the recipient in possession of the private key.

There is also provided a non-transitory computer-readable storage medium comprising computer-readable instructions which, when executed by a processing entity of a computing apparatus, cause the computing apparatus to carry out operations to encrypt a digital asset by carrying out the aforementioned method of encryption, for example.

BRIEF DESCRIPTION OF THE DRAWINGS

These and other aspects will best be understood from the following description and with reference to the accompanying drawings in which:

FIG. 6 shows a variant of the system in FIG. 1, where a disambiguation sub-process is used for correctly identifying a decrypted digital asset from a plurality of candidate solutions.

FIG. 7 shows a comparison of private key, public key and ciphertext sizes for various encryption methods including a configuration of one non-limiting embodiment disclosed herein, referred to as Option A.

FIG. 8 shows a comparison of private key, public key and ciphertext sizes for various encryption methods including two configurations of another non-limiting embodiment disclosed herein, referred to as Option B.

The drawings are intended to aid in understanding certain aspects of the disclosure and are not intended to be limiting.

DETAILED DESCRIPTION

Figure 1:
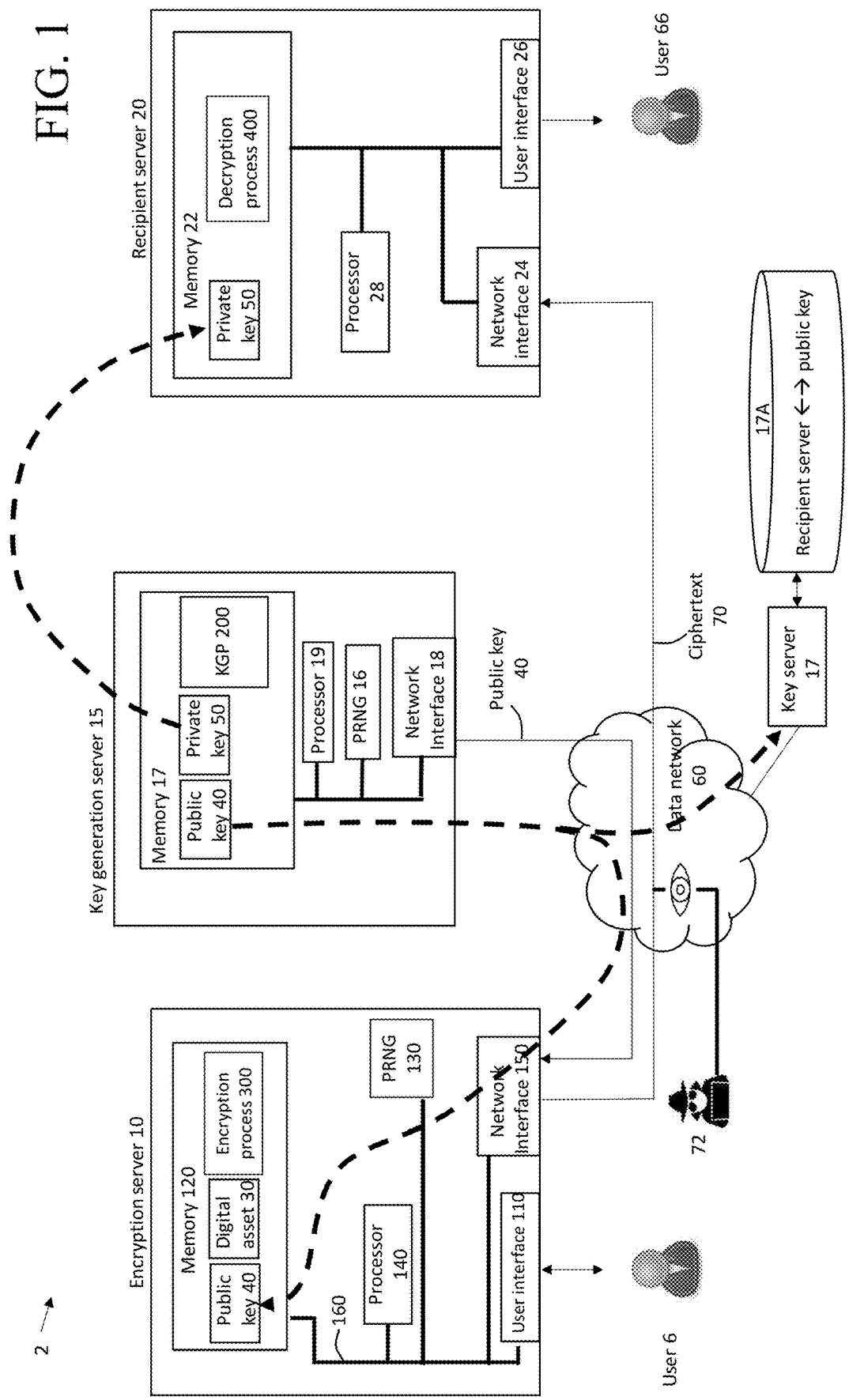
FIG. 1 is a block diagram of a communication system implementing an encryption process and a decryption process in accordance with a non-limiting embodiment.

With reference to FIG. 1, there is shown a system 2 that is a practical application of certain described methods of generating and using a highly secure cryptographic key pair in an asymmetric cryptography scenario. The cryptographic key pair comprises a "public key" 40 and a corresponding "private key" 50 generated in accordance with a pre-determined computing process that may be carried out by a key generation server 15. The cryptographic key pair is used for secure communications between an encryption server 10 and a recipient server 20. In a non-limiting embodiment, one or both of the encryption server 10 and the recipient server 20 may be a mobile device or a laptop/desktop computer communicating over a data network 60 which may traverse the Internet and may include one or more wireless networks. It is wroth noting that certain embodiments achieve NIST Level I, Level III or even Level V security yet the number of bits taken up by the public and private (secret) keys is small, which makes the current approach more suitable than existing approaches where tolerance to latency is low, where bandwidth may be low, where little computational power may be available and/or where computer memory/storage may be at a premium.

The encryption server 10 may comprise a user interface 110 for interfacing with a user 6. The user interface 110 may be a graphical user interface 110 and may be configured to elicit information from the user (e.g., through a keyboard or a touchscreen) and to exhibit information for the user, e.g., through a display.

The encryption server 10 is configured to encrypt a digital asset 30 into an encrypted message (also referred to as a ciphertext) 70 using the recipient's "public key" 40 (stored in a memory of the encryption server 10). In various non-limiting embodiments, the digital asset 30 may be a file, a document or a cryptographic key (such as may be used for subsequent encryption of another digital asset). The recipient's public key 40 can be made available (e.g., distributed or transmitted over the Internet or another data network or combination of networks) to entities (such as the encryption server 10) who wish to securely communicate with the recipient server 20. The recipient server 20 applies a decryption technique to the encrypted message 70 using the recipient's "private key" 50, in order to recover the digital asset 30. The recipient's private key 50 may be stored in a memory at the recipient server 20 and be withheld from other entities such as the encryption server 10.

Due to generation of the key pair 40, 50 based on a specific computing process and the use of "noise variables" (as will be described herein below) in the generation of the keys by the encryption server 15, the private key 50 is extremely difficult to obtain from the public key 40, even after observing multiple encrypted messages 70 encrypted with the same public key 40. This makes the present encryption scheme highly secure. Also, the operations according to which the digital asset 30 is encrypted into the encrypted message 70 and according to which the digital asset 30 is decrypted/recovered from the encrypted message 70 are of relatively low computational complexity and relatively low latency.

Generation of Key Pair

Figure 2:
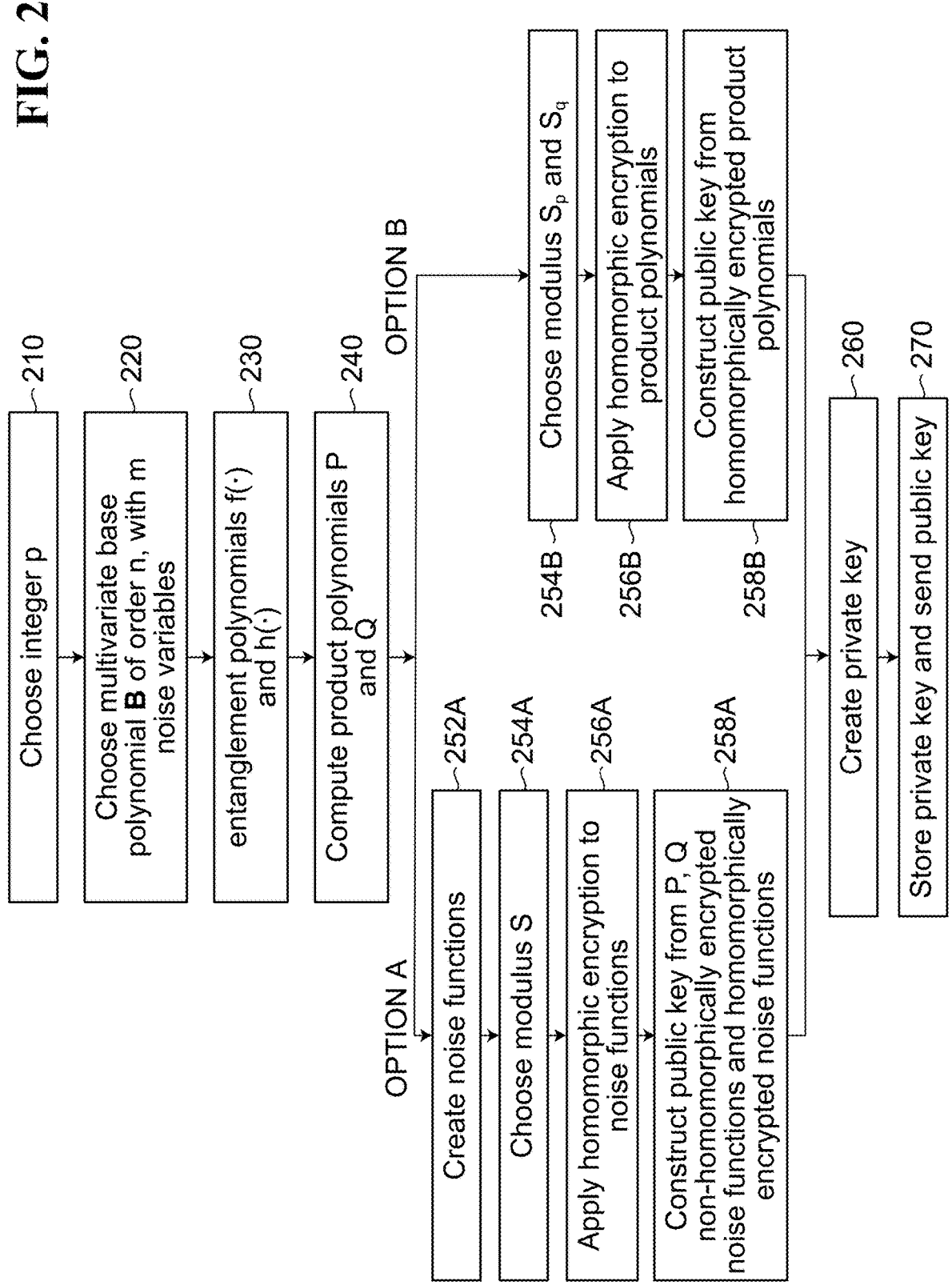
FIG. 2 is a flowchart showing steps in an example key generation process for determining the components of a recipient's private and public keys, in accordance with a non-limiting embodiment.

FIG. 2 shows steps in a key generation process (KGP) 200 for determining the components (data elements) of the recipient's private and public keys, in accordance with a non-limiting embodiment. In one embodiment, the key generation process 200 may be carried out by executing computer-readable instructions stored in the memory of the same computing apparatus as implements the recipient server 20. In another embodiment, the key generation process 200 may be carried out by the key generation server 15 by executing computer-readable instructions in a memory of the key generation server 15. The key generation server 15 may be a separate third-party computing apparatus that publishes (or otherwise renders available) the recipient's public key 40 over the data network 60 (e.g., to the encryption server 10). The key generation server 15 may also be configured to provide for secure delivery of the recipient's private key 50 to the recipient server 20 (e.g., via out-of-band delivery, i.e., not over the data network 60, although there is nothing form a technological standpoint to prevent delivery of the private key 50 to the recipient server 20 over the data network 60).

The steps in the key generation process 200 include various sub-steps, and not all steps or sub-steps need be performed in the order described.

Step 210:
The key generation process includes obtaining from memory an integer p for modulo arithmetic. The integer p can be stored in computer memory using $\log_2 p$ bits. In various embodiments, p can require 6, 8, 10, 12, 14, 16 or more bits. Although in some embodiments, it may be preferable that p be prime, it need not be in all cases. In the following, $\varphi(\cdot)$ represents Euler's totient function and therefore $\varphi(p)$ equals the totient function of p. Furthermore, all computations described below are performed as modulo p ("mod p") unless otherwise indicated. A modulo computation is an arithmetic operation performed in a computer that finds the remainder when a first integer is divided by a second integer, thus limiting the result to between 0 and one less than the second integer.

Step 220:
The key generation process 200 includes obtaining from memory a set of data elements that define coefficients of a multivariate base polynomial $B(x_0, x_1, \ldots, x_m)$ of order n. In some embodiments, n can be pre-selected and stored in the memory of the key generation server 15. There is no particular limitation on the value of n. Non-limiting examples for the value of n include 3, 4, 5, 6, 7, 8, 9, 10 or higher. Typically, the greater the value of n, the more secure the system 2 will be.

The multivariate base polynomial $B(x_0, x_1, \ldots, x_m)$ can be expressed as:

$$B(x_0, x_1, \ldots, x_m) = \sum_{i=0}^{n} \sum_{j=1}^{m} b_{ij} x_j x_0^i$$

$$= \sum_{j=1}^{m} B_j(x_0) x_j \text{ where } B_j(x_0) = \sum_{i=0}^{n} b_{ij} x_0^i \ (j=1, 2, \ldots, m).$$

The coefficients of multivariate base polynomial $B(x_0, x_1, \ldots, x_m)$ can thus include the coefficients $b_{ij}$ for (i=0, 1, 2, \ldots, n) and for (j=1, 2, \ldots, m), which can be stored in the memory of the key generation server 15.

Each $B_j(x_0)$, j=1, 2, \ldots, m, is a univariate polynomial in the variable $x_0$, and $x_1 \ldots, x_m$ can be referred to as "noise variables" (or permutation data elements), of which there are m. The multivariate base polynomial $B(x_0, x_1, \ldots, x_m)$ can therefore be considered a linear combination of m univariate polynomials $B_j(x_0)$, j=1, 2, \ldots, m, with the coefficients of the linear combination corresponding to the noise variables $x_1 \ldots, x_m$.

Figure 3:
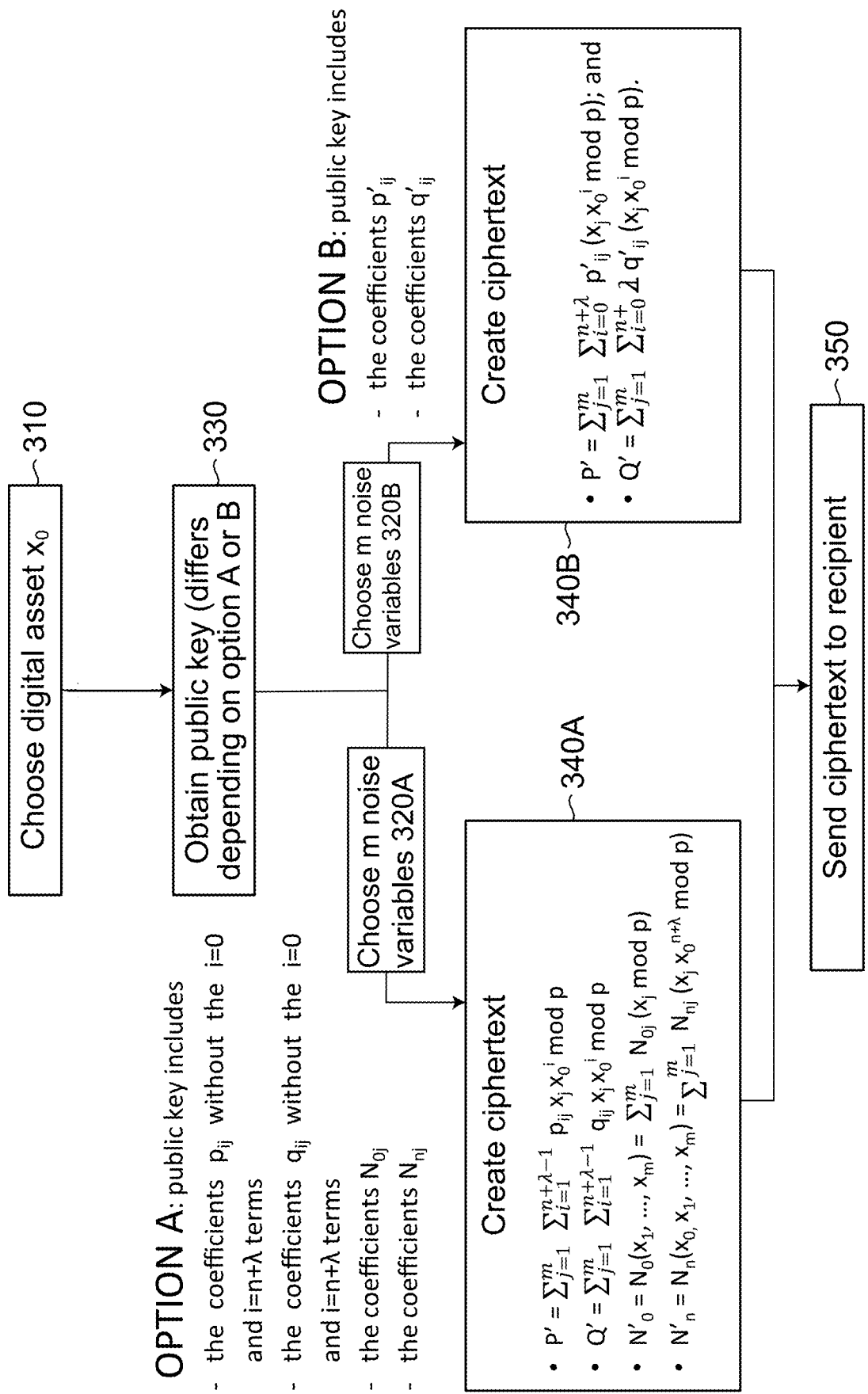
FIG. 3 is a flowchart showing steps in an example encryption process, in accordance with a non-limiting embodiment.

As will be shown later on, these noise variables $x_1 \ldots, x_m$, whose values are selected at runtime by the encryption server 10, add to the security of the encryption process (to be described herein below with reference to FIG. 3).

The value of m (i.e., the number of noise variables) is a secure parameter that can be arbitrarily set to any positive integer based on the security level, without any particular limitation except for security considerations, i.e., the higher the value of m, the greater the security level, all other variables being equal. Non-limiting examples for the value of m include 1, 2, 3, 4, 5, 6, 7, 8, 9, 10 or higher.

The values of m and n may be stored in the memory of the key generation server 15.

Step 230:
The key generation process 200 includes choosing the coefficients of a pair of entanglement polynomials $f(\cdot)$ and $h(\cdot)$ of degree $\lambda$:

$$f(x_0) = \sum_{i=0}^{\lambda} f_i x_0^i$$

$$h(x_0) = \sum_{i=0}^{\lambda} h_i x_0^i$$

By keeping the order of each of the entanglement polynomials $f(\cdot)$ and $h(\cdot)$ relatively low (such as by keeping $\lambda$ equal to 1, 2 or 3, for example), these polynomials have analytically derivable roots, which will be useful as will be shown later on. The value of $\lambda$ may be stored in the memory of the key generation server 15.

The values of the $f_i$ and the $h_i$ (i=0, 1, 2, \ldots, $\lambda$) can be chose arbitrarily such as from the output of a pseudo-random number generator 16 implemented by the key generation entity 15. The values are selected over the finite field GF(p), which is a prime finite field GF(p) if p is prime.

Step 240:
The key generation process 200 includes constructing a pair of product polynomials, $P(x_0, x_1, \ldots, x_m)$ and $Q(x_0, x_1, \ldots, x_m)$, by multiplying the base polynomial $B(x_0, x_1, \ldots, x_m)$ with the univariate entanglement polynomials $f(\cdot)$ and $h(\cdot)$, respectively:

$$P(x_0, x_1, \ldots, x_m) = B(x_0, x_1, \ldots, x_m) f(x_0) = \sum_{j=1}^{m} P_j(x_0) x_j, \text{ where } P_j(x_0) = \sum_{j=1}^{m} x_j \sum_{i=0}^{n+\lambda} p_{ij} x_0^i \text{ and}$$

$$Q(x_0, x_1, \ldots, x_m) = B(x_0, x_1, \ldots, x_m) h(x_0) = \sum_{j=1}^{m} Q_j(x_0) x_j, \text{ where } Q_j(x_0) = \sum_{j=1}^{m} x_j \sum_{i=0}^{n+\lambda} q_{ij} x_0^i,$$

and where $$p_{ij} = \sum_{s+t=i} f_s b_{tj}$$

$$q_{ij} = \sum_{s+t=i} h_s b_{tj}.$$

Step 250:

The key generation process 200 includes creating the recipient's public key 40, as will now be described according to one of two options: Option A (homomorphic encryption of "noise functions") or Option B (homomorphic encryption of product polynomials). Option A and Option B represent different levels of security. These can be chosen by the user 6 at runtime via the user interface of the encryption server 10, in which case both options may be made available ahead of time by the encryption server 10.

Option A (Homomorphic Encryption of "Noise Functions")

Step 252A:

The key generation process 200 may be configured to create two noise functions:

a first noise function $N_0(x_1 \ldots, x_m) = \sum_{j=1}^{m} b_{0j} x_j \mod p$; and a second function $N_n(x_0, x_1 \ldots x_m) = \sum_{j=1}^{m} b_{nj} x_j x_0^{n+\lambda} \mod p$.

Step 254A:

The key generation process 200 then chooses a number S with a bit length $l_s >= 2 \cdot \log_2 p + \log_2 m$ as a modulus for homomorphic encryption. S can be randomly generated (e.g., as the output of the pseudo random number generator 16), as long as it obeys the aforementioned constraint that the number of bits needed to express S is at least as great as the sum of twice the number of bits needed to express p and the number of bits needed to express m. In a practical example, if p is a 64-bit value in memory (i.e., needs 64 bits to be represented) and m is an 8-bit value in memory, then the modulus S should be represented using at least $2 \cdot 64 + 8 = 136$ bits.

Step 256A:

The key generation process 200 may then apply homomorphic encryption to the noise functions, as follows:

Choose 2 random numbers $R_0$ and $R_n$ as encryption keys for homomorphic encryption and $GCD(R_0, S) = 1$ and $GCD(R_n, S) = 1$, i.e., both $R_0$ and $R_n$ are coprime with the chosen modulus S. These two random numbers may be produced by the PRNG 16, as long as they obey the aforementioned constraints of being coprime with the modulus S.

Homomorphically encrypt the first and second noise functions:

$$N'_0(x_1, \ldots, x_m) = \sum_{j=1}^{m} (R_0 b_{0j} \mod S) x_j = \sum_{j=1}^{m} N_{0j} x_j$$

$$N'_n(x_0, x_1, \ldots, x_m) = \sum_{j=1}^{m} (R_n b_{nj} \mod S) x_j x_0^{n+\lambda} = \sum_{j=1}^{m} N_{nj} x_j x_0^{n+\lambda}$$

Homomorphic encryption performs computations on encrypted data without first decrypting it, with the resulting computations being left in an encrypted form and which, when decrypted, result in an identical output to that produced had the operations been performed on the unencrypted data.

In particular, the above homomorphic encryption at step 256A maps both noise functions to a hidden ring marked by the secret modulo S, as appropriate. A hidden ring means that the largest Integer in the ring (S) is hidden from the encryption server 10, the ring being a set equipped with two binary operations satisfying properties analogous to those of addition and multiplication of integers.

It is recalled that S is known only to the key generation server 15 (i.e., it is not known to the encryption server 10), and also $R_0$ and $R_n$ are also hidden from the encryption server 10. As such, an attacker 72 would only be able to access $c = (R_0 \cdot a) \mod S$. In order to know the value of "a", the attacker must know $R_0$ and S. The attacker 72 would need to brute force the ring for both $R_0$ and S with a condition $GCD(R_0, S) = 1$, which is computationally difficult.

Step 258A:

The encryption server 15 then creates a data structure in the memory that includes the recipient's public key 40. The data structure for the recipient's public key 40 may be populated by the following data elements:

a. the coefficients of $P(x_0, x_1, \ldots, x_m)$ from step 240 but without the $i=0$ and $i=n+\lambda$ terms, i.e., the coefficients of $\sum_{j=1}^{m} x_j \sum_{i=1}^{n+\lambda-1} p_{ij} x_0^i$ b. the coefficients of $Q(x_0, x_1, \ldots, x_m)$ from step 240 but without the $i=0$ and $i=n+\lambda$ terms, i.e., the coefficients of $\sum_{j=1}^{m} x_j \sum_{i=1}^{n+\lambda-1} q_{ij} x_0^i$ c. the coefficients of the homomorphically encrypted first noise function $N'_0(x_1, \ldots, x_m)$ d. the coefficients of the homomorphically encrypted second noise function $N'_n(x_0, x_1, \ldots, x_m)$ Option B (Homomorphic Encryption of Product Polynomials)

Step 254B:

The key generation process 200 includes choosing two values $S_p$ and $S_q$ with a bit length $l_s >= 2 \cdot \log_2 p + \log_2 [m(n+\lambda+1)]$ as a modulus for homomorphic encryption. $S_p$ and $S_q$ can be randomly generated, such as the output of a pseudo-random number generator. $S_p$ and $S_q$ can be randomly generated (e.g., as the output of the pseudo random number generator 16), as long as they obey the aforementioned constraint that the number of bits needed to express $S_p$ and $S_q$ is at least as great as the sum of twice the number of bits needed to express p and the number of bits needed to express the product of $m(n+\lambda+1)$.

Step 256B:

The key generation process 200 applies homomorphic encryption as follows:

Choose 2 random numbers $R_p$ and $R_q$ as encryption keys for homomorphic encryption and $GCD(R_p, S_p) = 1$ and $GCD(R_q, S_q) = 1$, i.e., $R_p$ and $R_q$ are coprime with the chosen modulus.

Compute the following:

$$P'(x_0, x_1, \ldots, x_m) = [R_p P(x_0, x_1, \ldots, x_m)] \mod S_p$$

$$= \sum_{j=1}^{m} x_j \sum_{i=0}^{n+\lambda} [(R_p p_{ij} \mod S_p)] x_0^i$$

$$= \sum_{j=1}^{m} \sum_{i=0}^{n+\lambda} p'_{ij} x_0^i x_j$$

$$Q'(x_0, x_1, \ldots, x_m) = [R_q Q(x_0, x_1, \ldots, x_m)] \mod S_q$$

$$= \sum_{j=1}^{m} x_j \sum_{i=0}^{n+\lambda} [(R_q q_{ij} \mod S_q)] x_0^i$$

$$= \sum_{j=1}^{m} \sum_{i=0}^{n+\lambda} q'_{ij} x_0^i x_j$$

Step 258B:
  The key generation process 200 is then configured to form the recipient's public key 40 is by assembling the following data elements:
    a. the coefficients of $P'(x_0, x_1, \ldots, x_m) = \sum_{j=1}^{m} \sum_{i=0}^{n+\lambda} p'_{ij} x_0^i x_j$
    b. the coefficients of $Q'(x_0, x_1, \ldots, x_m) = \sum_{j=1}^{m} \sum_{i=0}^{n+\lambda} q'_{ij} x_0^i x_j$
  The recipient's public key can thus be represented by matrices $P'[n+\lambda+1, m]$ and $Q'[n+\lambda+1, m]$ with elements over the ring Z/SZ, with integers from 0 to $S_p-1$ or $S_q-1$ as appropriate.

In either case (option A after execution of steps 252A, 254A, 256A, 258A or option B after execution of steps 254B, 256B, 258B), the key generation process 200 returns to the main branch of the flowchart in FIG. 2.

Step 260:
  The encryption server 15 then creates a data structure in the memory that includes the recipient's private key 50. The data structure for the recipient's private key 50 may be populated by the following data elements:
    a. the coefficients of $f(\cdot)$ (i.e., $f_0, f_1, \ldots, f_\lambda$);
    b. the coefficients of $h(\cdot)$ (i.e., $h_0, h_1, \ldots, h_\lambda$); and
    c. S and $R_0$ and $R_n$ (under option A/step 260A) or $S_p$, $S_q$, $R_p$ and $R_q$ (under option B/step 260B)

Step 270:
  The key generation process 200 may cause the recipient's private key 50 to be securely stored in a memory of the recipient server 20. For example, the key generation server 15 may communicate the recipient's private key 50 to the recipient server 20 over the data network 60, over another network that is not the data network 60 or over an out-of-band connection. In another embodiment, the key generation process 200 is carried out by the recipient server 20 itself. The key generation process 200 may also cause the recipient's public key 40 to be made available to would-be encryptors such as the encryption server 10. This can be done by sending the public key 40 to the encryption server 10 over the data network 60 or sending the public key 40 to a key server 17, which may be a web server 17 reachable over the data network 60. The key server 17 may store a database 17A in which a network address of the recipient server 20 (e.g., an internet address or URL) is associated with the recipient's public key 40. In this way, the recipient's public key 40 can be accessible to entities such as the encryption server 10. However, the recipient's private key 50 remains withheld from the encryption server 10, is kept secret and is not made available over the data network 60.

Data Encryption

Armed with the recipient's public key 40 as defined above, the encryption server 10 may perform an encryption process 300 in accordance with a non-limiting embodiment, now described with reference to FIG. 3. The steps in the encryption process 300 include various sub-steps, and not all steps or sub-steps need be performed in the order described.

Step 310:
  The encryption server 10 determines a digital asset $x_0$. In one embodiment, the digital asset $x_0$ may be retrieved from the memory 120 of the encryption server 10. In such a scenario, the digital asset $x_0$ may comprise a file, image, video, cryptographic key or other data element stored in a non-transitory medium. Such data element may represent a document, transaction, financial instrument or other information of value to the user. In another embodiment, the digital asset $x_0$ may be obtained from the user 6 by the user providing the digital asset via the user interface 110, such as a graphical user interface. In such a scenario, the digital asset $x_0$ may comprise credentials such as a username, password, social insurance number or other information that the user wishes to transmit to the recipient server in secrecy.

In an embodiment, the digital asset $x_0$ is restricted to be converted to or represented by an integer value from 1 to p−1. It is recalled that p can be expressed using a certain number of bits, such as 8, 16, 32, 64 or more (or any number of bits in between, depending on operational considerations). The value of p is known to the encryption server 10 and may be stored in the memory 120. It is noted that for the integer p to be known to the encryption server 10, the integer p can be part of the recipient's public key 40 or it can be a known security parameter (i.e., known to the encryption server 10 and other participants in the system). The integer p may be odd or even, prime or compound. In some cases, it may be preferable for p to be a prime for security considerations. For example, if p is represented using b bits, then p could be the largest prime less than $2^b$. An example is the largest prime number of a 64-bit field (which is $p=2^{64}-59=18{,}446{,}744{,}073{,}709{,}551{,}557$). Taking p as a prime, particularly a large prime, might improve the performance for key generation.

Step 330:
  The encryption server 10 obtains the recipient's public key 40 which. As mentioned above, the recipient's public key 40 is different for Option A and for Option B. The choice between Option A and Option B may be part of the encryption process 300. Specifically, the encryption process may provide via the GUI 110 an opportunity for the user 6 to select between Option A (high security) and Option B (higher security). As such, based on the input received via the user interface 110, the encryption process 300 determines whether to use the recipient's public key 40 for Option A or for Option B. In other embodiments, the choice of Option A or Option B is pre-determined without user input. In still other embodiments, the encryption server 10 is configured to only carry out the encryption process 400 for Option A or for Option B.

It is noted that for Option A, the public key 40 comprises:
  the coefficients $p_{ij}$ without the i=0 and i=n+λ terms
  the coefficients $q_{ij}$ without the i=0 and i=n+λ terms
  the coefficients $N_{0j}$
  the coefficients $N_{nj}$ As for Option B, the public key 40 comprises:
  the coefficients $p'_{ij}$
  the coefficients $q'_{ij}$ Depending on the Option:

OPTION A:—Homomorphically Encrypted Noise Functions Only

Step 320A:
  The encryption server 10 chooses m noise variables $x_1, \ldots, x_m$, which are generated mod p, i.e., from 1 to p−1. For example, these could be random numbers such as may be output from a pseudo-random number generator (PRNG) 130, and in some embodiments this may indeed be preferable. In other cases, the noise variables $x_1, \ldots, x_m$ are randomly chosen by the encryption server/module 10 and they need not be committed to memory. In a further embodiment, the PRNG 130 operates based on a seed provided or triggered by the system timer.

Step 340A:
The encryption server 10 computes the following quantities, based on the digital asset $x_0$ and the recipient's public key 40:

$$\overline{P}'=\Sigma_{j=1}^{m}\Sigma_{i=1}^{n+\lambda-1}p_{ij}x_j x_0^i \bmod p \qquad \text{a.}$$

$$\overline{Q}'=\Sigma_{j=1}^{m}\Sigma_{i=1}^{n+\lambda-1}q_{ij}x_j x_0^i \bmod p \qquad \text{b.}$$

$$\overline{N}'_0=N_0(x_1,\ldots,x_m)=\Sigma_{j=1}^{m}N_{0j}x_j \qquad \text{c.}$$

$$\overline{N}'_n=N_n(x_0,x_1,\ldots,x_m)=\Sigma_{j=1}^{m}N_{nj}(x_j x_0^{n+\lambda} \bmod p) \qquad \text{d.}$$

The data elements $\overline{P}'$, $\overline{Q}'$, $\overline{N}'_0$, $\overline{N}'_n$ can be stored in a data structure in the memory 120 of the encryption server 10. The encryption server 10 may create a ciphertext 70 containing data elements $\overline{P}'$, $\overline{Q}'$, $\overline{N}'_0$, $\overline{N}'_n$ (which also can be referred to as a "ciphertext tuple").

OPTION B: Homomorphically Encrypted Product Polynomials—No Use of Noise Functions Step 320B:
The encryption server/module 10 chooses m noise variables $x_1, \ldots, x_m$, which are generated mod p, i.e., from 1 to p−1. For example, these could be random numbers such as may be output from a pseudo-random number generator (PRNG) 130, and in some embodiments this may indeed be preferable. In other cases, the noise variables $x_1, \ldots x_m$ are randomly chosen by the encryption server/module 10 and they need not be committed to memory. In a further embodiment, the PRNG 130 operates based on a seed provided or triggered by the system timer.

Step 340B:
The encryption server/module 10 computes the following quantities, based on the digital asset $x_0$ and the recipient's public key 40:

$$\overline{P}'=\Sigma_{j=1}^{m}\Sigma_{i=0}^{n+\lambda}p'_{ij}(x_j x_0^i \bmod p); \text{ and} \qquad \text{a.}$$

$$\overline{Q}'=\Sigma_{j=1}^{m}\Sigma_{i=0}^{n+\lambda}q'_{ij}(x_j x_0^i \bmod p). \qquad \text{b.}$$

The data elements $\overline{P}'$, $\overline{Q}'$ can be stored in a data structure in the memory 120 of the encryption server 10. The encryption server 10 creates a ciphertext 70 containing data elements $\overline{P}'$ and $\overline{Q}'$ (which can also be referred to as a "ciphertext tuple"). It is noted that the ciphertext tuple has two integers with a bit length>$\log_2 S$.

In Either Case (Option A or Option B), the Encryption Process 300 now Returns now to the Main Branch of the Flowchart:

Step 350:
The encryption server 10 sends the ciphertext 70 containing the appropriate "ciphertext tuple" (whose composition depends on the chosen option) to the recipient server 20. This can be done by sending a packet over the data network 160 via the network interface 150. The packet may have a destination address an address of the recipient server 20. On its way from the encryption server 10 to the recipient server 20, the packet including ciphertext 70 may traverse the data network 60 (e.g., the Internet) and other networks.

Decryption Using Private Key

Figure 4:
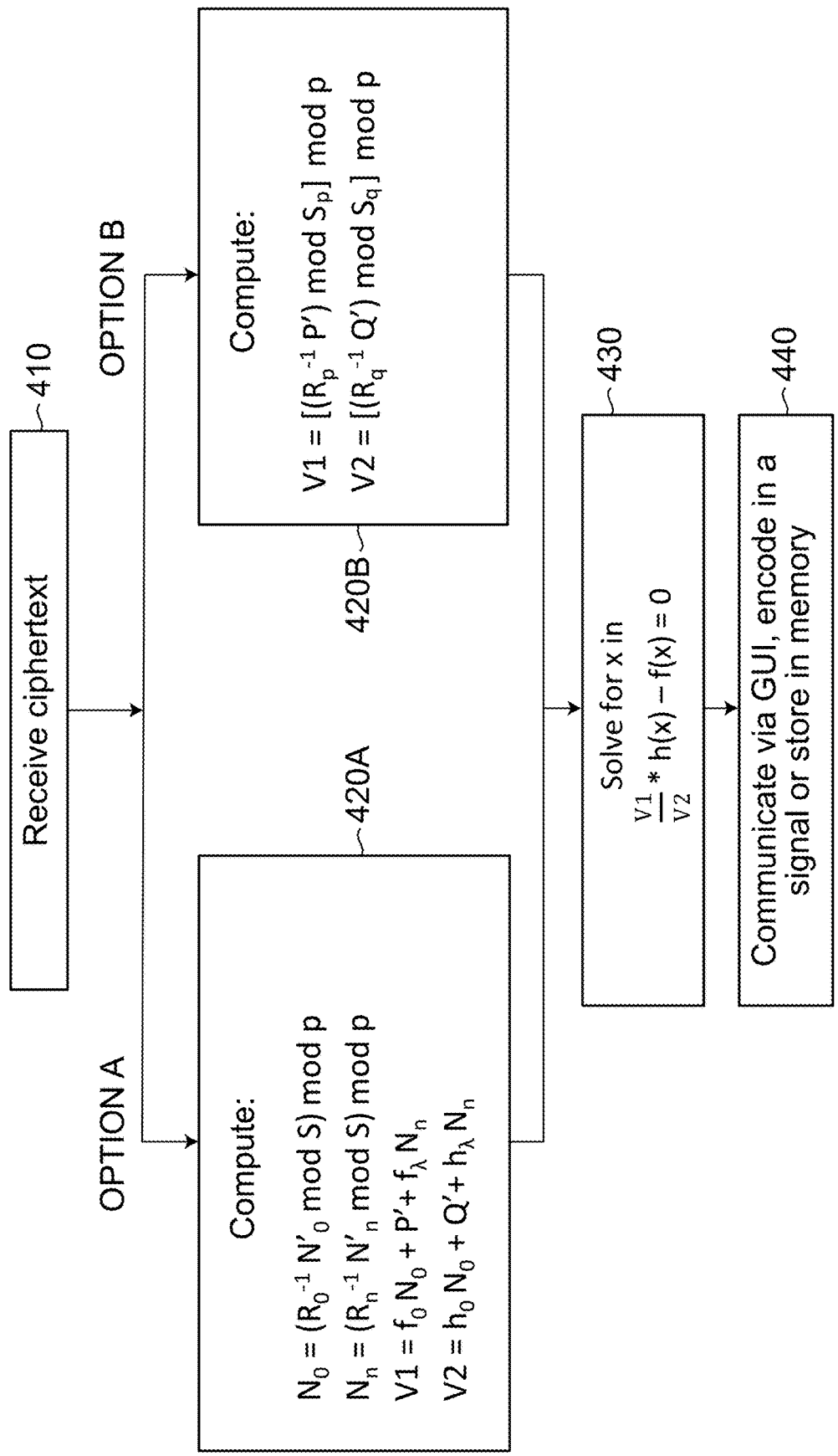
FIG. 4 is a flowchart showing steps in an example decryption process, in accordance with a non-limiting embodiment.
Figure 5:
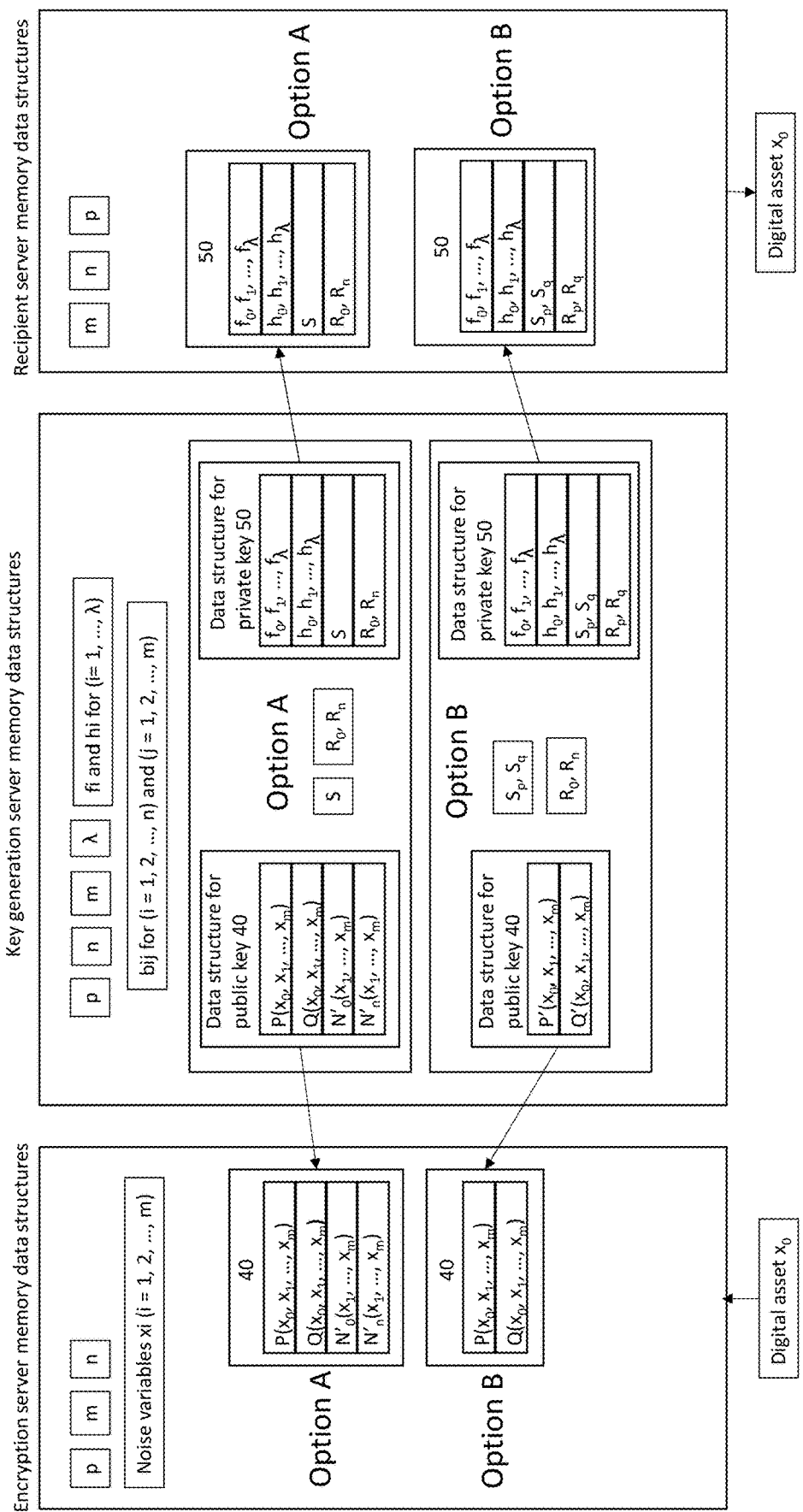
FIG. 5 is a block diagram illustrating possible data structures that could be stored in a memory of an encryption server, a decryption server and a key generation server, in accordance with a non-limiting embodiment.

In order to decrypt the digital asset $x_0$, the recipient server 20 may perform a decryption process 400 in accordance with a non-limiting embodiment, now described with reference to FIG. 4. The recipient server 20 stores in its memory 22 the private key 50 corresponding to the public key 40 used by the encryption server 10, as previously received from the key generation entity 15. The steps in the decryption process 400 include various sub-steps, and not all steps or sub-steps need be performed in the order described.

Step 410:
The decryption process 400 includes a step of receiving the ciphertext 70 containing the appropriate ciphertext tuple 70 which consists of $\overline{P}'$, $\overline{Q}'$, $\overline{N}'_0$, and $\overline{N}'_n$ (if option A was chosen) or just $\overline{P}'$ and $\overline{Q}'$ (if option B was chosen). The ciphertext 70 may be received over a network interface 24 through which the recipient server 20 is connected to the data network 60. It is recalled that the choice of Option A or Option B may be made at the encryption server 10 and in some cases may be selected y the user 60 via the user interface 110. As such, the choice of Option A or Option B may accompany the packet that carries the ciphertext 70 from the encryption server 10. Specifically, this packet may include a flag that informs the recipient server 20 as to whether Option A or Option B was selected. In other embodiments, the recipient server 20 knows which option is applicable based on the fact that it knows ahead of time that the encryption server 10 is implementing Option A or Option B. In still further examples, a second user 66 may inform the recipient server 20 via a user interface 26 as to the selection of Option A or Option B.

Option A—Homomorphic Encryption of Noise Functions Only, Ciphertext Tuple 70 Consists of $\overline{P}'$, $\overline{Q}'$, $\overline{N}'_0$ and $\overline{N}'_n$ Step 420A:
The decryption process 400 comprises computing the following variables (which can include intermediate quantities V1 and V2) based on the data elements of the received ciphertext tuple 70 ($\overline{P}'$, $\overline{Q}'$, $\overline{N}'_0$, and $\overline{N}'_n$) and based on some of the data elements of the private key 50 held in memory 22 by the recipient server 20 (certain examples being: $f_0$, $f_\lambda$, $h_0$, $h_\lambda$, $R_0$, $R_n$ and S).

$$\overline{N}_0=(R_0^{-1}\overline{N}'_0 \bmod S)\bmod p$$

$$N_n=(R_n^{-1}\overline{N}'_n \bmod S)\bmod p$$

$$V1=f_0\overline{N}_0+\overline{P}'+f_\lambda \overline{N}_n$$

$$V2=h_0\overline{N}_0+\overline{Q}'+h_\lambda \overline{N}_n$$

Option B—Homomorphic Encryption of Noise Functions Only, Ciphertext Tuple 70 Consists of $\overline{P}'$ and $\overline{Q}'$ Step 420B:
The decryption process 400 includes computing the following variables V1 and V2 based on the data elements of the received ciphertext tuple 70 ($\overline{P}'$ and $\overline{Q}'$) and based on some of the data elements of the private key 50 held in the memory 22 by the recipient server 20 (certain examples being: $R_p$, $R_q$, and $S_p$ and $S_q$):

$$V1=[(R_p^{-1}\overline{P}')\bmod S_p]\bmod p$$

$$V2=[(R_p^{-1}\overline{Q}')\bmod S_q]\bmod p$$

In Either Case (Option A or Option B), the Encryption Process 400 now Returns now to the Main Branch of the Flowchart:

Step 430:
The encryption process 400 includes the step of using the processor to solve the following equation for x:

$$(\frac{V1}{V2}\bmod p)*h(x)-f(x)=0.$$

It is recalled that the coefficients of the univariate entanglement polynomials f(·) and of h(·) are part of the recipient's private key 50 stored in memory 22 and therefore are known to the recipient server 20.

Since each of f(·) and h(·) is of relatively low order (e.g., $\lambda=1$, 2 or 3), the above equation is also of the same order and has derivable roots with radicals, simplifying analytical root derivation.

Therefore, in one embodiment, the roots can be computed based on an analytical derivation, whereas in another embodiment, the roots are computed purely numerically.

Those skilled in the art will appreciate that steps 420A/B and 430 may be collapsed into a single arithmetic expression involving the plurality of ciphers (data elements of the ciphertext 70) and the data elements of the private key 50, which is then solvable using the processor 28.

Specifically, steps 420A and 430 can be reduced to solving for x in the equation:

$$[(f_0(R_0^{-1}\overline{N}'_0 \bmod S) + \overline{P}' + f_\lambda(R_n^{-1}\overline{N}'_n \bmod S))/(h_0(R_0^{-1}\overline{N}'_0 \bmod S) + \overline{Q}' + h_\lambda(R_n^{-1}\overline{N}'_n \bmod S))]*h(x) - f(x) = 0 \bmod p$$

where $\overline{P}'$, $\overline{Q}'$, $\overline{N}N'_0$ and $\overline{N}'_n$ correspond to the data elements in the received ciphertext 70, and $R_0$, $R_n$ and $S$ are data elements of the private key 50. The aforementioned equation is solved for x using the processor 28.

Similarly, steps 420B and 430 can be reduced to solving for x in the equation:

$$[(R_p^{-1}\overline{P}' \bmod S_p)/(R_q^{-1}\overline{Q}' \bmod S_q)]*h(x) - f(x) = 0 \bmod p$$

where $\overline{P}'$ and $\overline{Q}'$ correspond to data elements in the received ciphertext 70, and $R_p$, $R_q$, $S_p$ and $S_q$ are data elements of the private key 50. The aforementioned equation is solved for x using the processor 28.

In both of the above cases, f(·) is the first entanglement function defined by coefficients $f_0, f_1, \ldots f_\lambda$ included in the private key 50 stored in the memory 22 and h(·) is the second entanglement function defined coefficients $h_0, h_1, \ldots h_\lambda$ included in the private key 50 stored in the memory 22.

It should also be appreciated that the values of m, n and p are predetermined and known to the encryption server 10 and the recipient server 20 for the purposes of a given instantiation of the encryption process 300 and the decryption process 400.

Step 440:

Decryption is now complete: the recipient server 20 assigns the solution to above equation (which should be an integer) to the digital asset $x_0$ (which was the subject of the encryption process 300). The decrypted digital asset $x_0$ can be communicated to the second user 66 via the user interface 26 (which can be a graphical user interface). In another embodiment, the decrypted digital asset $x_0$ can be packaged in a message sent over a data network (such as the data network 60). In yet another embodiment, the decrypted digital asset $x_0$ can be stored in the non-transitory memory 22.

Explanation

Consideration is now given to explaining why it is the case that a root of the above equation (step 430) corresponds to the digital asset $x_0$.

Option A

It is recalled that:

V1 was defined as $f_0 \overline{N}_0 + \overline{P}' + f_\lambda \overline{N}_n$ and
V2 was defined as $h_0 \overline{N}_0 + \overline{Q}' + h_\lambda \overline{N}_n$, where $\overline{N}_0 = [(R_0^{-1} \overline{N}'_0 \bmod S) \bmod p]$, $\overline{N}_n = [(R_n^{-1} \overline{N}'_n \bmod S) \bmod p]$, Because $\overline{P}' = \Sigma_{j=1}^{m} \Sigma_{i=1}^{n+\lambda-1} p_{ij} x_j x_0^i \bmod p$ (see step 340A) and because of the above definitions of $\overline{N}'_0$ and $\overline{N}'_n$ it follows that the aforementioned quantity V1 is actually equal to $P(x_0, x_1, \ldots, x_m) = B(x_0, x_1, \ldots, x_m) f(x_0)$.

Because $\overline{Q}' = \Sigma_{j=1}^{m} \Sigma_{i=1}^{n+\lambda-1} q_{ij} x_j x_0^i \bmod p$ (see step 340A) and because of the above definitions of $\overline{N}'_0$ and $\overline{N}'_n$, it follows that the aforementioned quantity V2 is actually equal to $Q(x_0, x_1, \ldots x_m) = B(x_0, x_1, \ldots, x_m) h(x_0)$.

Option B

It is recalled that:

V1 was defined as $[(R_p^{-1} \overline{P}') \bmod S_p] \bmod p$
V2 was defined as $[(R_q^{-1} \overline{Q}') \bmod S_q] \bmod p$ Because $\overline{P}' = \Sigma_{j=1}^{m} \Sigma_{i=0}^{n+\lambda} p'_{ij}(x_j x_0^i \bmod p)$ (see step 340B) and because $q'_{ij} = (R_p p_{ij} \bmod S_p)$ (see step 264B), it turns out that the aforementioned quantity V1 is actually equal to $P(x_0, x_1, \ldots x_m) = B(x_0, \lambda_1, \ldots, \lambda_m) f(x_0)$.

Similarly, because $\overline{Q}' = \Sigma_{j=1}^{m} \Sigma_{i=0}^{n+\lambda} q'_{ij}(x_j x_0^i \bmod p)$ (see step 340B) and because $q'_{ij} = (R_p q_{ij} \bmod S_q)$ (see step 264B), it turns out that the aforementioned quantity V1 is actually equal to $Q(x_0, x_1, \ldots, x_m) = B(x_0, x_1, \ldots, x_m) h(x_0)$.

Conclusion for Both Options

Therefore, for either option A or option B, when computing the ratio of V1 to V2 at step 430, it is the same as computing the ratio of $P(x_0, x_1, \ldots, x_m)$ to $Q(x_0, x_1, \ldots, x_m)$. In other words:

$$\frac{V1}{V2} = \frac{P(x_0, x_1, \ldots, x_m)}{Q(x_0, x_1, \ldots, x_m)}.$$

Now, recalling (from step 220) that $P(x_0, x_1, \ldots, x_m)$ was defined as $B(x_0, x_1, \ldots, x_m) f(x_0)$ and $Q(x_0, x_1, \ldots, x_m)$ was defined as $B(x_0, x_1, \ldots, x_m) h(x_0)$, one has:

$$\frac{P(x_0, x_1, \ldots, x_m)}{Q(x_0, x_1, \ldots, x_m)} = \frac{f(x_0)}{h(x_0)}$$

Therefore, from the above two equations, one has:

$$\frac{V1}{V2} = \frac{f(x_0)}{h(x_0)} \bmod p.$$

This further yields:

$$\frac{V1}{V2} * h(x_0) - f(x_0) = 0.$$

As a result, $x_0$ is the solution to (or, of there is more than one solution, is one of the solutions to):

$$\frac{V1}{V2} * h(x) - f(x) = 0.$$

With f(x) and h(x) being of order no more than 3, it may be possible to derive roots without requiring significant computational effort on the part of the recipient server 20, yet it is extremely difficult for a malicious entity 72 to determine this root without the recipient's private key 50.

Of course, it is possible to derive roots numerically, which can be done for lambda greater than 3 as well.

Disambiguation

There are instances where the above equation has an integer-valued root and one or more other real-valued roots (for example, one other real root if the equation at step 430 is a quadratic in x, one or two other real roots if it is a cubic). In that case, the integer-valued root is assigned to the digital asset $x_0$ because it is known that $x_0$ is an integer.

There are also instances where the above equation has more than one integer-valued real solution (for example, two real roots if the equation at step 430 is a quadratic, two or three real roots if it is a cubic). In that case, it may not be possible for the recipient server 20 to know which one to assign to the digital asset $x_0$ without further information. To this end, and with additional reference to FIG. 6, the encryption server 10 stores a flag 602 in the memory 120. The flag 602 (for example, a predetermined code such as a message authentication code (MAC)) may be received by the encryption server 10 from the key generation server 15 over the data network 60, possibly together with the recipient's public key 40. Additionally, the flag 602 is stored in the memory 22 of the recipient server 20. As such, the key generation server 15 may be configured to transmit the flag 602 to the recipient server 20, which can be done possibly over the data network 60 (or out of band), and possibly together with the recipient's private key 50.

The encryption process 200 is configured to append the flag 602 to the digital asset $x_0$ prior to encryption, e.g., prior to step 340A (for Option A) or step 340B (for Option B). This results in an augmented digital asset $x_0^* = x_0 |\ 602$. Moreover, step 340A (or 340B) is performed with $x_0^*$ rather than the original version of the digital asset $x_0$. As such, the resulting ciphertext (denoted 70\*) will be different from the ciphertext 70 produced based on the original digital asset $x_0$.

At the recipient server 20, steps 410, 420A/420B and 430 of the decryption process 400 are executed, which will reveal one of several possible roots, only one of which will be $x_0^* = x_0 |\ 602$. Since the decryption process 400 knows the value of the flag 602, the decryption process 400 can call a disambiguation sub-process 410 that identifies which of the candidate solutions includes the flag 602. The remainder of this identified solution is returned by the disambiguation process 410 and is assigns the value of the remainder to the digital asset $x_0$. In this way, the one root/solution that passes the disambiguation sub-process 410 is then considered to be the digital asset. The disambiguation sub-process 410 may be encoded as computer-readable instructions stored in the memory 22 and executed by the processor 28, potentially under control of the decryption process 400.

In another embodiment, instead of using a predetermined flag 602 that is known to the encryption server 10 and the recipient server 20, the encryption server 10 produces a checksum from the digital asset $x_0$. The checksum could be an XOR of the various bits that make up the digital asset $x_0$. Since the checksum is generated from the digital asset $x_0$ itself, it need not be stored in or received from the key generation server 15, and it need not be shared with the recipient server 20. In this embodiment, the encryption process 200 is configured to append the checksum to the digital asset $x_0$ prior to encryption, e.g., prior to step 340A (for Option A) or step 340B (for Option B). This results in an augmented digital asset $x_0^{} = x_0 | \text{checksum}$. Moreover, step 340A (or 340B) is performed with $x_0^{}$ rather than the original version of the digital asset $x_0$. As such, the resulting ciphertext will be different from the ciphertext 70 or from ciphertext 70\*.

At the recipient server 20, steps 410, 420A/420B and 430 of the decryption process 400 are executed, which will reveal one of several possible roots, only one of which will be $x_0^{} = x_0 | \text{checksum}$. The decryption process 400 can again call the disambiguation sub-process 410** which, in this embodiment, performs the checksum on the portion of each solution that could potentially correspond to the digital asset $x_0$ and compares it to the portion of each solution that potentially corresponds to the checksum. The correct solution (and assigned to the value of the digital asset $x_0$) is the one for which there is a match between the computed checksum and the data element occupying the checksum position.

Security Analysis

Option A

Without knowledge of $R_0$, $R_n$ and S over a ring Z/SZ, the public key 40 is not helpful to a malicious party 72 trying to crack the private key 50. The modular arithmetic computations cannot be performed without knowing S. The brute force complexity of the triple $\{R_0, R_n, S\}$ is more than O $(p^{4-mn+3m=2\lambda-2m\lambda})$, using Big-O notation. As such, even relatively small bit sizes for p (e.g., 16, 32 or 64) make the computational complexity required to crack the private key 50 prohibitive.

The table below shows possible parameter values $\log_2 p$ (i.e., number of bits for p), n, $\lambda$ and m, expressed as a quadruple (_,_,_,_), to achieve various NIST (National Institute of Standards and Technology of the U.S. Department of Commerce) security levels for Option A.

| Option A | Security Level I | Security Level III | Security Level V |
|---|---|---|---|
| ($\log_2 p$, n, $\lambda$, m) | (64, 1, 1, 5) | (64, 1, 1, 6) | (64, 1, 1, 7) |

The security levels are described by NIST as follows:
Level I: At least as hard to break as AES128 (exhaustive key search)
Level: II At least as hard to break as SHA256 (collision search)
Level III: At least as hard to break as AES192 (exhaustive key search)
Level IV: At least as hard to break as SHA384 (collision search)
Level V: At least as hard to break as AES256 (exhaustive key search)

Those skilled in the art will obtain more information about these security levels at nist.gov and/or in a paper entitled "NIST PQC Standardization Update" by Dustin Moody, September 2020, available at https://csrc.nist.gov/CSRC/media/Presentations/pqc-update-round-2-and-beyond/images-media/pgcrypto-sept2020-moody.pdf, hereby incorporated by reference herein.

FIG. 7 shows a comparison of private key (or secret key), public key and ciphertext sizes for various encryption methods including a non-limiting embodiment of Option A. It is seen that Option A uses a significantly smaller number of total bits for the keys and the ciphertext than any of McEllice, Kyber, NTRU or Saber for the same NIST level of security. This allows Option A to achieve outstanding security performance with shorter data elements and a smaller memory footprint, allowing better compatibility with devices that have lower computational power and/or smaller memory storage and/or have lower toleration to latency (i.e., are sensitive to real-time responses).

Option B

Without knowledge of $R_p$, $R_q$, $S_p$ and $S_q$ over a ring Z/SZ, the public key 40 is not helpful to a malicious party 72 trying to crack the private key 50. The modular arithmetic computations cannot be performed without knowing $S_p$ and $S_q$. The brute force complexity of the quadruple $\{R_p, R_q, S_p, S_q\}$ is more than $O(S_p^4)^\sim O(S_q^4)^\sim O(p^8)$, using Big-O notation. As such, even relatively small bit sizes for p (e.g., 16, 32 or 64) make the computational complexity required to crack the private key 50 prohibitive. It is noted that in some embodiments of Option B, $S_p$ may be set equal to $S_q$.

In particular, the applicable attacking strategy is to extract plaintext from HPPK ciphertexts $\bar{P}'$ and $\bar{Q}'$ by solving the following equations:

$$\bar{P}' = \sum_{j=1}^{m}\sum_{i=0}^{n+\lambda} p'_{ij}(x_j x_0^i \bmod p) = \sum_{j=1}^{m}\sum_{i=0}^{n+\lambda} p'_{ij} v_{ij}$$

$$\bar{Q}' = \sum_{j=1}^{m}\sum_{i=0}^{n+\lambda} q'_{ij}(x_j x_0^i \bmod p) = \sum_{j=1}^{m}\sum_{i=0}^{n+\lambda} q'_{ij} v_{ij}$$

With unknown variables $v_{ij} = (x_j x_0^i \bmod p)$ defined over GF(p) for $i=0, 1, \ldots, \lambda$ and $j=1, 2, \ldots, m$, the total number of unknown variables is $m(n+\lambda+1)$. Due to unknown modulus (S, or $S_p$ and $S_q$), possible modular arithmetic calculations are restricted so the better strategy is to perform modulo p to above two equations:

$$\bar{P}' = \sum_{j=1}^{m}\sum_{i=0}^{n+\lambda} p''_{ij} x_j x_0^i$$

$$\bar{Q}' = \sum_{j=1}^{m}\sum_{i=0}^{n+\lambda} q''_{ij} x_j x_0^i$$

With $p''_{ij} = p'_{ij} \bmod p$ and $q''_{ij} = q'_{ij} \bmod p$, so one has two equations with $m+1$ variables (namely $x_0, x_1, \ldots, x_m$). Using Gaussian elimination, one can easily reduce these two equations into a general form:

$$G(x_0, x_1, \ldots, x_{m-1}) = 0 \bmod p.$$

This is a modular Diophantine Equation problem. Such a Diophantine equation problem is NP-complete with a complexity only $O(p^{m-1})$. Therefore, the overall complexity of this technique is $O(p^{m-1})$.

More specifically, for recovery of $x_0$, the modular Diophantine Equation with m noise variables produces $p^{m-1}$ solutions of $(x, x_1, \ldots, x_m)$, with each possible x being equally likely found with a probability $1/p$. For NIST level V of 256 bits, p would be 64 bits. As for recovery of the private key 50, Option B requires the attacker to brute force minimum $(R_p, S_p)$ and $(R_q, S_q)$ with a complexity $O(p^{4+o(1)})$.

The table below shows possible parameter values $\log_2 p$ (i.e., number of bits for p), n, $\lambda$ and m, expressed as a quadruple (_,_,_,_), to achieve various NIST security levels for Option B.

| OPTION B | Security Level I | Security Level III | Security Level V |
|---|---|---|---|
| ($\log_2 p$, n, $\lambda$, m) | (32, 1, 1, 2) | (48, 1, 1, 2) | (64, 1, 1, 2) |
| ($\log_2 p$, n, $\lambda$, m) | (32, 1, 1, 3) | (48, 1, 1, 3) | (64, 1, 1, 3) |

FIG. 8 shows a comparison of private key, public key and ciphertext sizes for various encryption methods including two non-limiting embodiments of Option B. It is seen that Option B uses a significantly smaller number of total bits for the keys and the ciphertext than any of McEllice, Kyber, NTRU or Saber for the same NIST level of security. This allows Option B to achieve outstanding security performance with shorter data elements and a smaller memory footprint, allowing better compatibility with devices that have lower computational power and/or smaller memory storage and/or have lower toleration to latency (i.e., are sensitive to real-time responses).

Those skilled in the art will appreciate that the entities referred to above as "sender", "encryptor", "recipient", "destination", "key generation entity" and the like, which carry out the various encryption and decryption methods and protocols described above, can be realized by computing apparatuses executing computer-readable program instructions stored on non-transitory computer-readable media. Such computing apparatuses could be any of a smartphone, laptop, desktop computer, tablet, mainframe, vehicle ECU or IoT (Internet-of-Things) device, to name a few non-limiting possibilities.

The encryption server 10 includes a computer-readable storage medium 120, which can be a tangible device capable of storing program instructions for use by a processor 140. The computer-readable storage medium 120 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium 120 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, does not include transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The program instructions can be downloaded to the computer-readable storage medium 120 from an external computer or external storage device via the data network 60, which can include the Internet, a local area network, a wide area network and/or a wireless network. The data network 60 may comprise copper transmission cables, optical transmission fibers, wireless transmission, routers, firewalls, switches, gateway computers and/or edge servers. A network adapter card or network interface 150 in the encryption server 10 receives program instructions over the data network 60 and forwards them to the computer-readable storage medium 120 for storage and execution by the processor 140. Execution of the program instructions by the processor 140 results in the encryption server 10 carrying out processes such as the encryption process 300 and other processes (including an operating system, for example).

A user interface 110 is also connected to the processor and may include various input and/or output devices, as well as program instructions that interact with the various input and/or output devices so as to elicit input from the user 60 and provide output to the user 60 via the input and/or output devices. The user interface 110 may be a graphical user interface for interfacing with the user 6. A bus architecture 160 may interconnect the user interface 110, the processor 140, the memory 120 and the network interface 150.

A pseudo-random number generator 130 may also be implemented by the encryption server 10 and may be interconnected to other components of the encryption server 10 by the bus architecture. In other embodiments, the pseudo-random number generator 130 may be implemented in software by the processor 140 executing program code stored in the memory 120.

The key generation server 15 includes a computer-readable storage medium 17, which can be a tangible device capable of storing program instructions for use by a processor 19. The computer-readable storage medium 17 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium 17 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, does not include transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The program instructions can be downloaded to the computer-readable storage medium 17 from an external computer or external storage device via the data network 60. A network adapter card or network interface 18 in the key generation server 15 receives program instructions over the data network 60 and forwards them to the computer-readable storage medium 17 for storage and execution by the processor 19. Execution of the program instructions by the processor 19 results in the key generation server 15 carrying out processes such as the key generation process 200 and other processes (including an operating system, for example).

A bus architecture may interconnect the processor 19, the memory 17 and the network interface 18.

A pseudo-random number generator 16 may also be implemented by the key generation server 15 and may be interconnected to other components of the key generation server 15 by the bus architecture. In other embodiments, the pseudo-random number generator 16 may be implemented in software by the processor 19 executing program code stored in the memory 17.

The recipient server 20 includes a computer-readable storage medium 22, which can be a tangible device capable of storing program instructions for use by a processor 28. The computer-readable storage medium 22 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium 22 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, does not include transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The program instructions can be downloaded to the computer-readable storage medium 22 from an external computer or external storage device via the data network 60. A network adapter card or network interface 24 in the recipient server 20 receives program instructions over the data network 60 and forwards them to the computer-readable storage medium 22 for storage and execution by the processor 28. Execution of the program instructions by the processor 28 results in the recipient server 20 carrying out processes such as the decryption process 400 and other processes (including an operating system, for example).

A user interface 26 is also connected to the processor and may include various input and/or output devices, as well as program instructions that interact with the various input and/or output devices so as to elicit input from the user 60 and provide output to the user 60 via the input and/or output devices. The user interface 26 may be a graphical user interface for interfacing with the second user 66. A bus architecture may interconnect the user interface 26, the processor 28, the memory 22 and the network interface 24.

The various program instructions referred to above may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the program instructions by utilizing state information to personalize the electronic circuitry, in order to carry out aspects of the present disclosure.

Aspects of the present disclosure are described herein with reference to flowcharts and block diagrams of methods and apparatus (systems), according to various embodiments. It will be understood that each block of the flowcharts and block diagrams, and combinations of such blocks, can be implemented by execution of the program instructions. Namely, the program instructions, which are read and processed by the processor 530 of the computing apparatus 510, direct the processor 530 to implement the functions/acts specified in the flowchart and/or block diagram block or blocks. It will also be noted that each block of the flowcharts and/or block diagrams, and combinations of such blocks, can also be implemented by special purpose hardware-based systems that perform the specified functions or acts or carry out combinations of special purpose hardware and computer instructions.

The flowcharts and block diagrams illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It should be appreciated that throughout the specification, discussions utilizing terms such as "processing", "computing", "calculating", "determining", "analyzing" or the like, can refer to the action and/or processes of a computer or computing system, or similar electronic computing device, that manipulate and/or transform data represented as physical, such as electronic, quantities into other data similarly represented as physical quantities.

As used herein, unless otherwise specified, the use of the ordinal adjectives "first", "second", "third", etc., to describe a common object or step, merely indicate that different instances of like objects or steps are being referred to, and are not intended to imply that the objects or steps so described must be in a given sequence, either temporally, spatially, in ranking, or in any other manner.

It is noted that various individual features may be described only in the context of one embodiment. The particular choice for description herein with regard to a single embodiment is not to be taken as a limitation that the particular feature is only applicable to the embodiment in which it is described. Various features described in the context of one embodiment described herein may be equally applicable to, additive, or interchangeable with other embodiments described herein, and in various combinations, groupings or arrangements. In particular, use of a single reference numeral herein to illustrate, define, or describe a particular feature does not mean that the feature cannot be associated or equated to another feature in another drawing figure or description.

Also, when the phrase "at least one of C and D" is used, this phrase is intended to and is hereby defined as a choice of C or D or both C and D, which is similar to the phrase "and/or". Where more than two variables are present in such a phrase, this phrase is hereby defined as including only one of the variables, any one of the variables, any combination of any of the variables, and all of the variables.

The foregoing description and accompanying drawings illustrate the principles and modes of operation of certain embodiments. However, these embodiments should not be considered limiting. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

What is claimed is:

1. A method of operating a first computing apparatus of a recipient for cryptographic communication with a second computing apparatus, the method comprising:
   receiving a message from the second computing apparatus;
   identifying a plurality of ciphers in the received message;
   retrieving from a memory of the first computing apparatus a private cryptographic key associated with the recipient, the private cryptographic key corresponding to a public cryptographic key associated with the recipient, the private cryptographic key comprising a plurality of private cryptographic key data elements;
   solving for x in an equation:

$$[(f_0(R_0^{-1}\overline{N}'_0 \bmod S) + \overline{P}' + f_\lambda(R_n^{-1}\overline{N}'_n \bmod S))/(h_0(R_0^{-1}\overline{N}'_0 \bmod S) + \overline{Q}' + h_\lambda(R_n^{-1}\overline{N}'_n \bmod S))]*h(x) - f(x) = 0 \bmod p,$$ where:

p is a predetermined integer stored in the memory of the first computing apparatus;
   $\overline{P}'$, $\overline{Q}'$, $\overline{N}'_0$, and $\overline{N}'_n$ correspond to the ciphers in the received message;
   $R_0$, $R_n$ and S are included in the private cryptographic key data elements;
   $f(\cdot)$ is a first polynomial function defined by a set of coefficients $f_0, f_1, \ldots f_\lambda$ included in the private cryptographic key data elements, with $\lambda$ being a predetermined integer; and
   $h(\cdot)$ is a second polynomial function defined by a set of coefficients $h_0, h_1, \ldots h_\lambda$ included in the private cryptographic key data elements;
   assigning the value of x to a digital asset; and
   storing the digital asset in non-transitory memory or packaging the digital asset in a message sent over a data network.

2. The method defined in claim 1, further comprising receiving the private cryptographic key from a key generation server over an out-of-bank link.

3. The method defined in claim 1, further comprising receiving the private cryptographic key from a key generation server not over the data network.

4. The method defined in claim 1, further comprising generating the public cryptographic key and the private cryptographic key.

5. The method defined in claim 4, further comprising withholding the private cryptographic key from a sender of the message.

6. The method defined in claim 4, further comprising sending the public cryptographic key to a sender of the message over the data network.

7. The method defined in claim 1, wherein $\lambda$ is selected to be no greater than 3.

8. The method defined in claim 1, wherein when solving for x yields a plurality of candidate solutions, the method further comprises selecting one of the candidate solutions as the digital asset.

9. The method defined in claim 8, wherein selecting one of the candidate solutions as the digital asset comprises:
   comparing a portion of each of the candidate solutions against a predetermined flag or code and selecting as the digital asset the candidate solution for which the compared portion matches the predetermined flag or code; or
   performing a checksum on each candidate solution and comparing the checksum to a received checksum associated with each candidate solution and selecting as the digital asset the candidate solution for which the checksums are matching.

10. The method defined in claim 1, wherein the public cryptographic key is formed from:
   a. a first set of public key coefficients, being the coefficients of a first product polynomial in x obtained as the product of (i) a base polynomial in x of order n and m noise variables and (ii) a first entanglement polynomial f(x), minus the coefficient of $x^0$ and the coefficient of $x^{n+\lambda}$, with m and n being predetermined integers stored in the memory of the first computing apparatus;

b. a second set of public key coefficients, being the coefficients of a second product polynomial in x obtained as the product of (i) said base polynomial in x of order n and said m noise variables and (ii) a second entanglement polynomial h(x), minus the coefficient of $x^0$ and the coefficient of $x^{n+\lambda}$;

c. a third set of public key coefficients, being the coefficients of a first linear combination of the noise variables, each multiplied by $R_0$ and then mod S; and d. a fourth set of public key coefficients, being the coefficients of a second linear combination of the noise variables, each multiplied by $R_n$ and then mod S.

11. The method defined in claim 10, wherein successful decryption of the digital asset occurs if the public cryptographic key was used by a sender to encrypt the digital asset by:

a. computing the cipher $\overline{P}'$ as the result of using the first set of public key coefficients as the coefficients of a first polynomial of the digital asset;

b. computing the cipher $\overline{Q}'$ as the result of using the second set of public key coefficients as the coefficients of a second polynomial of the digital asset;

c. computing the cipher $\overline{N}'_0$ as the result of using the third set of public key coefficients as the coefficients of the terms of a linear combination of the noise variables with values selected by the sender; and d. computing the cipher $\overline{N}'_n$ as the result of using the fourth set of public key coefficients as the coefficients of the terms of a linear combination of said noise variables multiplied by the digital asset to the power $n+\lambda$.

12. The method defined in claim 10, wherein p is selected to be at least as great as $2^6$, wherein n is selected to be at least as great as 3, or wherein m is selected to be at least as great as 2.

13. The method defined in claim 10, wherein p is selected to be at least as great as $2^6$, wherein n is selected to be equal to 1, and wherein m is selected to be equal to 1.

14. The method defined in claim 1, wherein p is represented by X bits and is selected to be the largest prime number less than $2^X$.

15. A non-transitory computer-readable storage medium comprising computer-readable instructions which, when executed by a processing entity of a first computing apparatus, cause the first computing apparatus to carry out operations for cryptographic communication with a second computing apparatus, the operations including:

receiving a message from the second computing apparatus;

identifying a plurality of ciphers in the received message;

retrieving from a memory of the first computing apparatus a private cryptographic key associated with a recipient, the private cryptographic key corresponding to a public cryptographic key associated with the recipient, the private cryptographic key comprising a plurality of private cryptographic key data elements;

solving for x in an equation:

$$[(f_0(R_0^{-1}\overline{N}'_0 \bmod S) + \overline{P}' + f_\lambda(R_n^{-1}\overline{N}'_n \bmod S))/(h_0(R_0^{-1}\overline{N}'_0 \bmod S) + \overline{Q}' + h_\lambda(R_n^{-1}\overline{N}'_n \bmod S))]*h(x) - f(x) = 0 \bmod p$$, where:

p is a predetermined integer stored in the memory of the first computing apparatus;

$\overline{P}'$, $\overline{Q}'$, $\overline{N}'_0$, and $\overline{N}'_n$ correspond to the ciphers in the received message;

$R_0$, $R_n$, $S_p$ and $S_q$ are included in the private cryptographic key data elements;

$f(\cdot)$ is a first polynomial function defined by a set of coefficients $f_0, f_1, \ldots f_\lambda$ included in the private cryptographic key data elements; and $h(\cdot)$ is a second polynomial function defined by a set of coefficients $h_0, h_1, \ldots h_\lambda$ included in the private cryptographic key data elements;

assigning the value of x to a digital asset; and storing the digital asset in non-transitory memory or packaging the digital asset in a message sent over a data network.

16. A method of operating a first computing apparatus of a recipient server for cryptographic communication with a second computing apparatus, the method comprising:

receiving a message from the second computing apparatus;

identifying a plurality of ciphers in the received message;

retrieving from a memory of the first computing apparatus a private cryptographic key associated with the recipient, the private cryptographic key corresponding to a public cryptographic key associated with the recipient, the private cryptographic key comprising a plurality of private cryptographic key data elements;

solving for x in an equation:

$$[(R_p^{-1}\overline{P}' \bmod S_p)/(R_q^{-1}\overline{Q}' \bmod S_q)]*h(x) - f(x) = 0 \bmod p$$, where:

p is a predetermined integer stored in the memory of the first computing apparatus;

$\overline{P}'$ and $\overline{Q}'$ correspond to the ciphers in the received message;

$R_p$, $R_q$, $S_p$ and $S_q$ are included in the private cryptographic key data elements;

$f(\cdot)$ is a first polynomial function defined by a set of coefficients $f_0, f_1, \ldots f_\lambda$ included in the private cryptographic key data elements; and $h(\cdot)$ is a second polynomial function defined by a set of coefficients $h_0, h_1, \ldots h_\lambda$ included in the private cryptographic key data elements;

assigning the value of x to a digital asset; and storing the digital asset in non-transitory memory or packaging the digital asset in a message sent over a data network.

17. The method defined in claim 16, further comprising receiving the private cryptographic key from a key generation server over an out-of-bank link.

18. The method defined in claim 16, further comprising receiving the private cryptographic key from a key generation server not over the data network.

19. The method defined in claim 16, further comprising generating the public cryptographic key and the private cryptographic key.

20. The method defined in claim 19, further comprising withholding the private cryptographic key from a sender of the message.

21. The method defined in claim 19, further comprising sending the public cryptographic key to a sender of the message over the data network.

22. The method defined in claim 16, wherein λ is selected to be no greater than 3.

23. The method defined in claim 16, wherein when solving for x yields a plurality of candidate solutions, the method further comprises selecting one of the candidate solutions as the digital asset.

24. The method defined in claim 16, wherein $S_p$ and $S_q$ are selected to be identical.

25. The method defined in claim 16, wherein the public cryptographic key is formed from:
   a. a first set of public key coefficients, being the coefficients of a first product polynomial in x obtained as the product of (i) a base polynomial in x of order n and m noise variables and (ii) a first entanglement polynomial f(x), minus the resulting coefficient of $x^0$ and the resulting coefficient of $x^{n+\lambda}$, each remaining coefficient multiplied by $R_p$ and then mod $S_p$, with m and n being predetermined integers stored in the memory of the first computing apparatus; and
   b. a second set of public key coefficients, being the coefficients of a second product polynomial in x obtained as the product of (i) said base polynomial in x of order n and said m noise variables and (ii) a second entanglement polynomial h(x), minus the resulting coefficient of $x^0$ and the resulting coefficient of $x^{n+\lambda}$, each remaining coefficient multiplied by $R_q$ and then mod $S_q$.

26. The method defined in claim 25, wherein successful decryption of the digital asset occurs if the public cryptographic key was used by a sender to encrypt the digital asset by:
   a. computing the cipher $\overline{P}'$ as the result of using the first set of public key coefficients as the coefficients of a first polynomial of the digital asset; and
   b. computing the cipher $\overline{Q}'$ as the result of using the second set of public key coefficients as the coefficients of a second polynomial of the digital asset.

27. The method defined in claim 25, wherein p is selected to be at least as great as $2^{32}$, wherein n is selected to be at least as great as 1, and wherein and m is selected to be at least as great as 1.

28. The method defined in claim 25, wherein p is selected to be at least as great as $2^{32}$, wherein n is selected to be at least as great as 1, and wherein and m is selected to be at least as great as 2.

29. A non-transitory computer-readable storage medium comprising computer-readable instructions which, when executed by a processing entity of a first computing apparatus, cause the computing apparatus to carry out operations for cryptographic communication with a second computing apparatus, the operations including:
   receiving a message from the second computing apparatus;
   identifying a plurality of ciphers in the received message;
   retrieving from a memory of the first computing apparatus a private cryptographic key associated with a recipient, the private cryptographic key corresponding to a public cryptographic key associated with the recipient, the private cryptographic key comprising a plurality of private cryptographic key data elements;
   solving for x in an equation:

$$[(R_p^{-1}\overline{P}' \bmod S_p)/(R_q^{-1}\overline{Q}' \bmod S_q)]*h(x)-f(x)=0 \bmod p$$, where:

p is a predetermined integer stored in the memory of the first computing apparatus;
   $\overline{P}'$ and $\overline{Q}'$ correspond to the ciphers in the received message;
   $R_p$, $R_q$, $S_p$ and $S_q$ are included in the private cryptographic key data elements;
   $f(\cdot)$ is a first polynomial function defined by a set of coefficients $f_0, f_1, \ldots f_\lambda$ included in the private cryptographic key data elements; and
   $h(\cdot)$ is a second polynomial function defined by a set of coefficients $h_0, h_1, \ldots h_\lambda$ included in the private cryptographic key data elements;
   assigning the value of x to a digital asset; and
   storing the digital asset in non-transitory memory or packaging the digital asset in a message sent over a data network.

30. A method of operating an encryption server of a first computing apparatus to encrypt a digital asset for transmission to a second computing apparatus over a data network, the method comprising:
   identifying a public key associated with a recipient, the public key comprising a first, a second, a third and a fourth set of public key coefficients, the public key being part of a public-private key pair associated with the recipient;
   selecting m noise variables, wherein m is an integer greater than or equal to 1;
   creating a plurality of ciphers based on the public key, the digital asset and the noise variables, wherein a ciphertext comprises:
      a first cipher computed as the result of using the first set of public key coefficients as the coefficients of a first polynomial of the digital asset;
      a second cipher computed as the result of using the second set of public key coefficients as the coefficients of a second polynomial of the digital asset;
      a third cipher computed as the result of using the third set of public key coefficients as the coefficients of terms of a linear combination of the noise variables; and
      a fourth cipher computed as the result of using the fourth set of public key coefficients as the coefficients of the terms of a linear combination of the noise variables multiplied by the digital asset to the power n+λ, where n and λ are integers at least as great as one; and
   sending a message comprising the plurality of ciphers over the data network towards the recipient server in possession of the private key.

* * * * *